(12) United States Patent
Mishmash et al.

(10) Patent No.: US 8,744,760 B1
(45) Date of Patent: Jun. 3, 2014

(54) SURFACE INFORMATION GENERATING SYSTEM, DEVICE, AND METHOD

(71) Applicants: Brian E. Mishmash, Atkins, IA (US); Stephen D. Kropp, III, Cedar Rapids, IA (US); Jorge A. Alvarez, Cedar Rapids, IA (US)

(72) Inventors: Brian E. Mishmash, Atkins, IA (US); Stephen D. Kropp, III, Cedar Rapids, IA (US); Jorge A. Alvarez, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/030,161

(22) Filed: Sep. 18, 2013

(51) Int. Cl.
*G01C 21/00* (2006.01)

(52) U.S. Cl.
USPC ............................................. 701/454

(58) Field of Classification Search
None
See application file for complete search history.

(56) References Cited

U.S. PATENT DOCUMENTS

| | | | |
|---|---|---|---|
| 4,748,569 A | 5/1988 | Gordon | |
| 6,985,901 B1 * | 1/2006 | Sachse et al. | 1/1 |
| 7,675,461 B1 * | 3/2010 | McCusker et al. | 342/179 |
| 7,714,744 B1 | 5/2010 | Wichgers | |
| 7,908,045 B1 * | 3/2011 | McCusker | 701/9 |
| 7,965,202 B1 | 6/2011 | Chiew et al. | |
| 8,234,020 B1 | 7/2012 | Wichgers et al. | |
| 2009/0248297 A1 | 10/2009 | Feyersisen et al. | |

OTHER PUBLICATIONS

"International Aeronautical and Maritime Search and Rescue Manual", 2013, pp. 5-6 through 5-30, vol. II, International Maritime Organization and International Civil Aviation Organization, London.
"Terrain Awareness and Warning System (TAWS)", Jun. 27, 2012, Technical Standard Order TSO-C151c, U.S. Federal Administration Agency, Washington, D.C.

* cited by examiner

*Primary Examiner* — Thomas Tarcza
*Assistant Examiner* — Adam Alharbi
(74) *Attorney, Agent, or Firm* — Donna P. Suchy; Daniel M. Barbieri

(57) ABSTRACT

A present novel and non-trivial system, device, and method for generating surface information presentable on a display unit is disclosed, where the surface information may be presented to draw a viewer's attention to threatening terrain location within a targeted area. An image generator ("IG") may be configured to receive navigation data; receive search data representative of at least a reference location, a targeted area, and a pattern comprised of a plurality of ground tracks; retrieve object data representative of object cell elevations of the targeted area; determine threat data representative of a threat level for each object cell; and generate an image data set representative of an image comprised of one or more threat-based search area location highlighters and/or one or more threat-based ground track location highlighters. The reference location could be comprised of a search pattern datum or a commencement search point.

20 Claims, 24 Drawing Sheets

SURFACE INFORMATION GENERATING SYSTEM, DEVICE, AND METHOD

BACKGROUND OF THE INVENTION

1. Field of the Invention

This invention pertains generally to the field of display systems such as, but not limited to, aircraft display systems.

2. Description of the Related Art

The International Maritime Organization ("IMO") and International Civil Aviation Organization ("ICAO") have jointly published the International Aeronautical and Maritime Search and Rescue ("IAMSAR") Manual; at the time of this writing, the 2013 Edition of the IAMSAR Manual is comprised of three volumes. The IAMSAR Manual contains guidelines for establishing a common aviation and maritime approach to the organization and conduct of SAR search-and-rescue ("SAR") operations.

Volume II of the IAMSAR Manual assists SAR personnel who plan and coordinate SAR operations and exercise. The volume presents (1) an overview of the SAR system concept provided in the IAMSAR Manual, (2) an overview of the communication associated with SAR operations, (3) the five stages through which responses to SAR incidents typically progress, (4) a detailed discussion of the theory and practice of search planning, (5) search techniques and operations, (6) a variety of aspects of rescue planning and operations, (7) guidance for emergency assistance other than SAR operations in which the SAR system may become involved, and (8) the orderly conclusion of SAR operations.

With respect to the performance of search techniques and operations, there are a plurality of search patterns from which to select. For example, there are visual search patterns, electronic search patterns, night search patterns, and land search patterns. While flying a search pattern, the pilot may elect to fly at a relatively low radio altitude; that is, the pilot may elect to fly at heights above the ground that are not flown during non-SAR operations. If a momentary loss of situational awareness is experienced, threatening terrain levels may go unnoticed.

BRIEF SUMMARY OF THE INVENTION

A present novel and non-trivial system, device, and method for generating surface information presentable on a display unit are disclosed. With the embodiments disclosed herein, a pilot flying in a targeted area and pattern (e.g., a search area and search pattern) may be advised of the presence of threatening terrain by viewing the appearance of area and/or ground tract location highlighters as he or she travels over the ground tracks and/or along the legs of the pattern.

In one embodiment, a system is disclosed for generating surface information presentable on a display unit. The system may be comprised of a source of navigation data, a source of search data, a source of object data, and an image generator ("IG"). The source of navigation data could be configured to provide data representative of at least aircraft position and heading; the source of search data could be configured to provide a reference location, a targeted area, and a plurality of legs defining a pattern and located within the targeted area; and the source of object data could be configured to provide object data representative of location and elevations of object cells. In an additional embodiment, the system could also be comprised of one or more display units configured to present an image represented in an image data set.

In another embodiment, a device is disclosed for generating surface information presentable on a display unit. The device may be comprised of the IG configured to perform the method disclosed in the following paragraph.

In another embodiment, a method is disclosed for generating surface information presentable on a display unit. The method may be comprised of receiving navigation data; receiving search data; retrieving object data corresponding to the search data; determining threat data representative of a threat level for each object cell based upon at least an altitude and object cell elevation; and generating an image data set based upon the navigation data, the search data, the object data, and the threat data, where the image data set is representative of an image of one or more search area location highlighters and one or more ground track location highlighters. Additionally, the method may be further comprised of providing the image data set to the display unit(s).

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
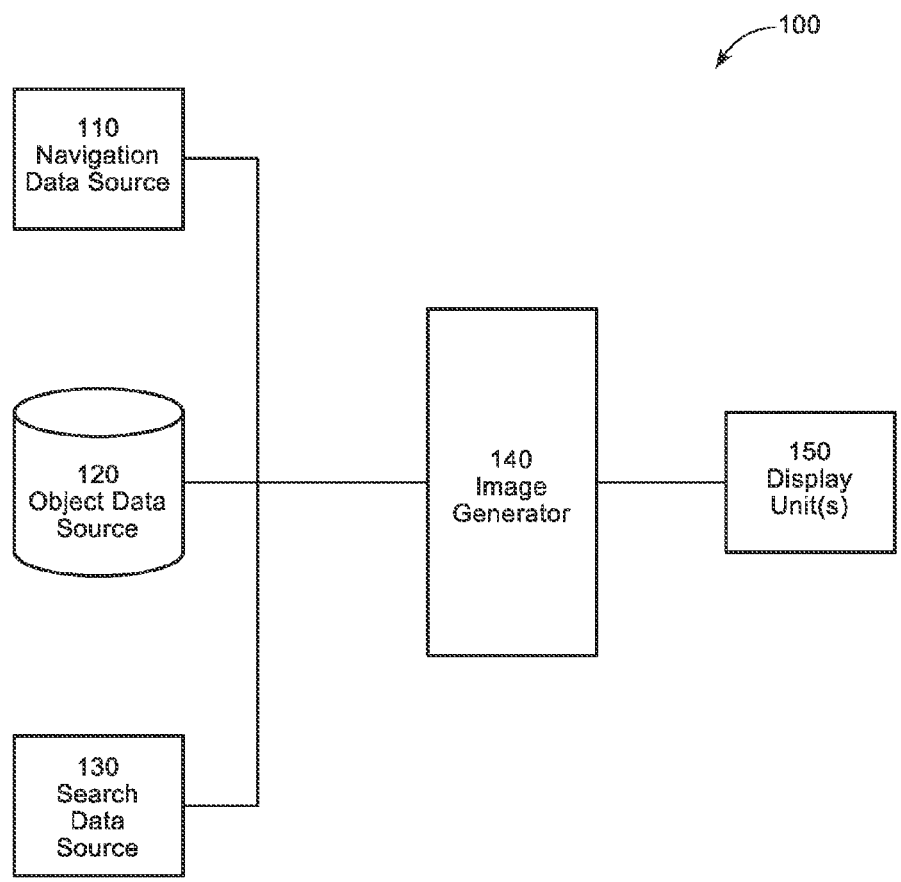
FIG. 1 depicts a block diagram of a system for generating an image of surface information presentable on a display unit.

FIG. 1 depicts a block diagram of a surface information generating and/or presenting system 100 suitable for implementation of the techniques described herein. The generating system 100 of an embodiment of FIG. 1 includes a navigation data source 110, an object data source 120, a search data source 130, and an image generator ("IG") 140, and a display unit(s) 150.

In the embodiment of FIG. 1, the navigation data source 110 could be comprised of a system or systems that may provide navigation data information in an aircraft. The navigation data source 110 may include, but is not limited to, an air/data system, an attitude heading reference system, an inertial guidance system (or inertial reference system), and a global navigation satellite system (or satellite navigation system), all of which are known to those skilled in the art. The navigation data source 110 could provide navigation data including, but not limited to, geographic position, altitude, heading, and attitude. As embodied herein, aircraft position may be comprised of geographic position (e.g., latitude and longitude coordinates) and altitude, and ground track may be derived from either geographic position, aircraft position, or both; aircraft orientation may be comprised of pitch, roll, and/or yaw information related to the attitude of the aircraft. As embodied herein, the navigation data source 110 could be configured to provide navigation data to the IG 140 for subsequent processing as discussed herein.

In an embodiment of FIG. 1 the navigation data source 110 could be further comprised of a flight management system ("FMS") which could perform a variety of functions performed to help the crew in the management of the flight; these functions are known to those skilled in the art. These functions could include receiving a flight plan (or planned flight route) and constructing a lateral and vertical flight plan from the flight plan. The flight plan could also include a search pattern. The flight plan and search pattern could be comprised of a series of waypoints, where each waypoint could include an altitude constraint associated with it. A pilot could create a flight plan by entering waypoints stored in a database or select a flight plan stored in a database of the FMS; also, the flight plan could be received and loaded into the FMS automatically through a datalink system known to those skilled in the art. With respect to a search-and-rescue operation ("SAR"), the flight plan comprised of a search pattern could be received and loaded by the FMS automatically; alternatively, the FMS could compute the flight plan of a search pattern if provided with search information such as, but not limited to, a reference datum of a search area, the type of search area, and a commence search point ("CSP"), and search pattern.

It should be noted that data, as embodied herein for any source or system in an aircraft, could be comprised of any analog or digital signal, either discrete or continuous, which could contain information. As embodied herein, aircraft could mean any vehicle which is able to fly through the air or atmosphere including, but not limited to, lighter than air vehicles and heavier than air vehicles, wherein the latter may include fixed-wing and rotary-wing vehicles. Additionally, aircraft could be watercraft capable of operating on or beneath water.

In the embodiment of FIG. 1, the object data source 120 could be comprised of any source of object data such as, but not limited to, data representative of elevations and/or locations of terrain, obstacles, other manmade or natural features, geopolitical boundaries, defined airspace, hazard weather regions, or any combination thereof. As embodied herein, the object data source 120 could be configured to provide object data to the IG 140 for subsequent processing as discussed herein.

As embodied herein, the object data source 120 may include, but is not limited to, a terrain database and other aircraft systems which could employ object data. The terrain database may be any database used to store terrain data contained in digital elevation models ("DEM"). Generally, the terrain data of a DEM is stored as grids, and each grid represents an area of terrain. A grid is commonly referred to as a terrain cell. A grid may be of various shapes. For example, a grid may be a cell defined in arc-seconds of latitude and longitude, or a grid may be rectangular, square, hexagonal, or circular. A grid may also be of differing resolutions. For instance, the U.S. Geological Society developed GTOPO30, a global DEM which may provide 30 arc-seconds (approximately 900 meters) resolution. On the other hand, the Space Shuttle Endeavour in February 2000 acquired elevation data known as Shuttle Radar Topography Mission ("SRTM") terrain elevation data which may provide generally one arc-second (or approximately 30 meters) resolution, providing much greater detail than that provided with GTOPO30 data set. Resolutions of one-arc second for SRTM terrain data have been available for areas over the United States; for all other locations, resolutions of three arc-seconds (approx. 90 meters) are available. In addition to these public sources of terrain data, there are military and private sources of terrain data. Various vendors and designers of avionics equipment have developed databases that have been, for all intents and purposes, proprietary in nature.

It should be noted that data contained in any database discussed herein including the terrain database may be stored in a digital memory storage device or computer-readable media including, but not limited to, RAM, ROM, CD, DVD, hard disk drive, diskette, solid-state memory, PCMCIA or PC Card, secure digital cards, and compact flash cards. Data contained in such databases could be loaded while an aircraft is on the ground or in flight. Data contained in such databases could be provided manually or automatically through an aircraft system capable of receiving and/or providing such manual or automated data. Data contained in such databases could be temporary in nature; for example, data representative of a temporary obstacle and/or temporary flight restriction could be stored in the terrain database.

Any database disclosed herein may be a stand-alone database or a combination of databases. For example, the terrain database may be associated with a terrain awareness and warning system ("TAWS") only. In an alternative embodiment, the terrain data could be stored in or combined with an airport database, airspace database, or with a database used by any other aircraft system including, but not limited to, a database associated with the FMS and an airspace awareness and warning system ("AAWS"). An example of a TAWS has been disclosed by Wichgers et al in U.S. Pat. No. 8,234,020 entitled "System and Methods for Generating Alert Signals in a Terrain Awareness and Warning System," which is incorporated by reference herein in its entirety. An example of an AAWS which utilizes airport and airspace databases has been disclosed by Wichgers in U.S. Pat. No. 7,714,744 entitled "System and Methods for Generating Alert Signals in an Airspace Awareness and Warning System," which is incorporated by reference herein in its entirety.

In an embodiment of FIG. 1, the search data source 130 could comprise any source of SAR data including, but not limited to, a datalink system and a manual input device; the search data source 130 could include the FMS. A datalink system could be comprised of any system(s) and/or device(s) configured to facilitate a wireless, two-way communication of data to and from sources external to the aircraft including, but not limited to, ground stations and satellites that could serve as the search data source 130. An example of a two-way communication of data is one in which a request for search data is sent via the datalink system 130 and/or SAR data is received via the datalink system. Once received, the SAR data could be provided to the IG 140 for subsequent processing as discussed herein.

A manual input device could allow the pilot or flight crew to enter SAR data manually instead of automatically. The manual input device could be comprised of any source for facilitating a pilot's interaction with graphical user interfaces ("GUI") referred to as interactive widgets that are displayed by the display unit(s) 150 (some non-interactive widgets could also be displayed). The manual input device may include any device that allows for the manual selection of a widget(s) corresponding to SAR operations and/or entry of data corresponding to such operations. Such devices could include, but are not limited to, a tactile device (e.g., a physical keyboard with tactile buttons, control display unit, cursor control device, stylus, electronic grease pen, handheld device, touch screen device, notebook, tablet, electronic flight bag, etc. . . . ) and/or speech recognition systems. The manual input device could be integrated with the display unit(s) 150 if it is configured to receive manual input (e.g., portable electronic devices, electronic flight bags, handheld device, touch screen device, notebook, tablet, etc. . . . ).

In an embodiment of FIG. 1, the IG 140 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The IG 140 may be programmed or configured to drive the execution of software or source code containing algorithms developed for the specific functions embodied herein. As embodied herein, the terms "programmed" and "configured" are synonymous with respect to the execution of software or source code developed for the specific functions and methods embodied herein. The IG 140 may be electronically coupled to systems and/or sources of data to facilitate the receipt of data; as embodied herein, operatively coupled may be considered as interchangeable with electronically coupled. It is not necessary that a direct connection be made; instead, such receipt of input data and the providing of output data could be provided through a data bus or through a wireless network.

Common examples of electronic data processing units are microprocessors, Digital Signal Processors (DSPs), Programmable Logic Devices (PLDs), Programmable Gate Arrays (PGAs), Application-Specific Integrated Circuits (ASICs), and signal generators; however, for the embodiments herein, the term "processor" is not limited to such processing units and its meaning is not intended to be construed narrowly. For instance, a processor could also consist of more than one electronic data processing unit. As embodied herein, the IG 140 could be a processor(s) used by or in conjunction with any other system of the aircraft including, but not limited to, a processor(s) associated with a vision system such as a synthetic vision system ("SVS"), an enhanced vision system ("EVS"), a combined SVS-EVS, an FMS, a TAWS, and an AAWS, or any combination thereof.

In an embodiment of FIG. 1, the display unit(s) 150 could be comprised of any display unit or units that provide symbology of tactical flight information and/or strategic flight information such as a tactical display unit and/or a strategic display unit, respectively. Although the following discussion is drawn toward display units physically installed in an aircraft, the embodiments disclosed herein may be applied to portable electronic devices configured with displays (e.g., laptop computers, electronic flight bags, handheld device, touch screen device, notebook, tablet, etc. . . . ). As embodied herein, the display unit(s) 150 could include a vision system (not shown in FIG. 1) which generates an image data set which represents the image displayed on a display unit(s). Vision systems include, but are not limited to, an SVS, an EVS, and/or a combined SVS-EVS.

The tactical display unit could be comprised of any unit that presents tactical information relative to the instantaneous or immediate control of the aircraft, whether the aircraft is in flight or on the ground. The tactical display unit could be comprised of a Head-Down Display ("HDD") unit and/or a Head-Up Display ("HUD") unit. The HDD unit is typically a unit mounted to an aircraft's flight instrument panel located in front of a pilot and below the windshield and the pilot's field of vision, and the HUD unit is mounted in front of the pilot at windshield level and is directly in the pilot's field of vision. The HUD system is advantageous because the display is transparent allowing the pilot to keep his or her eyes "outside the cockpit" while the display unit provides tactical flight information to the pilot.

The tactical display unit could display the same information found on a primary flight display ("PFD"), such as "basic T" information (i.e., airspeed, attitude, altitude, and heading). Although it may provide the same information as that of a PFD, the tactical display unit may also display a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. The tactical display unit is designed to provide flexible configurations which may be tailored to the desired configuration specified by a buyer or user of the aircraft.

The strategic display unit could be any unit which presents strategic information to the crew relative to the intended future state(s) of the aircraft (e.g. intended location in space at specified times) along with information providing contextual information to the crew (e.g. terrain, navigation aids, geopolitical boundaries, airspace boundaries, runway traffic and/or incursion information, etc.) about such state(s). One example of such display unit is commonly referred to as a Navigation Display. In some configurations, the strategic display unit could be part of an Electronic Flight Information System ("EFIS").

Figure 2A:
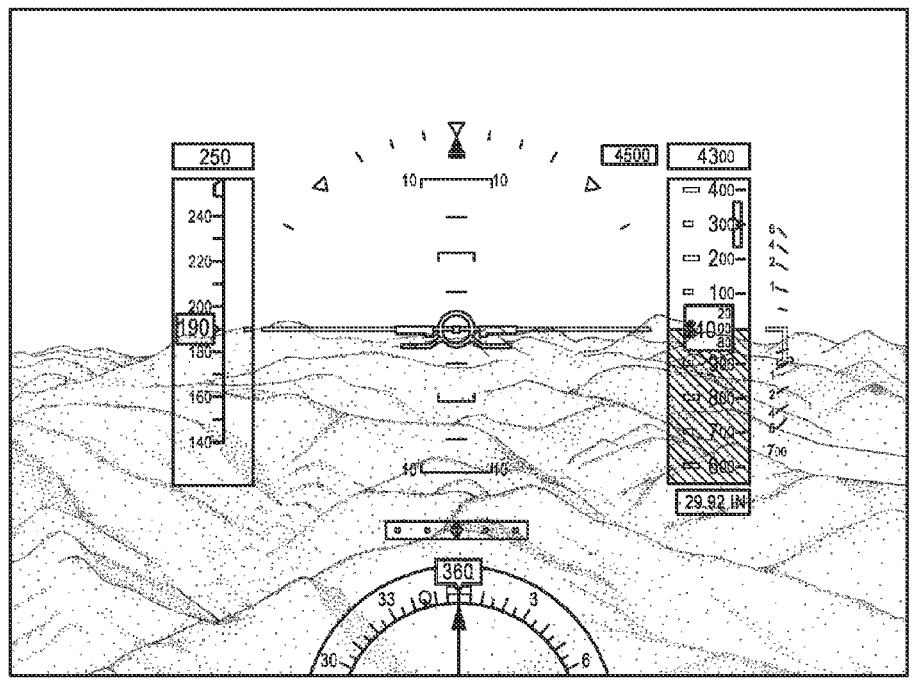
FIG. 2A presents an exemplary illustration of a Head-Down Display ("HDD") unit.
Figure 2B:
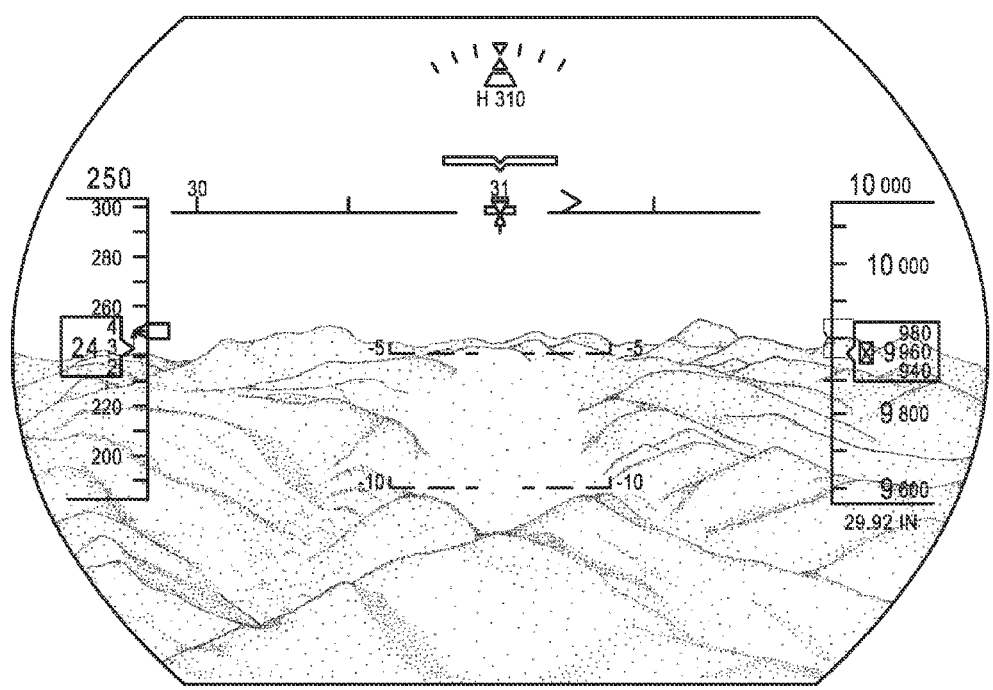
FIG. 2B presents an exemplary illustration of a Head-Up Display ("HUD") unit.

FIG. 2A provides an exemplary depiction of an HDD unit for presenting tactical information to the pilot or flight crew against the background of a three-dimensional image of terrain and sky. FIG. 2B provides an exemplary depiction of a HUD unit for presenting tactical information to the pilot or flight crew against the background of a three-dimensional image of terrain and sky. Both the HDD unit and HUD unit could be employed as display units configured to present SVS image(s), EVS image(s), or combined SVS-EVS image(s). It should be noted that the tactical information depicted on the HDD unit and/or HUD unit has been made minimal for the sake of presentation and is not indicative of the plurality of indications or information with which it may be configured. Because the indications or information shown in FIGS. 2A and 2B are well-known to those skilled in the art, a discussion of the specific tactical information shown on them is not provided herein.

Both the HDD unit and/or the HUD unit may be designed to provide flexible configurations which may be tailored to the desired configuration specified by a buyer or user of the aircraft. As disclosed below, a search area and a search pattern may be presented in a three-dimensional image of terrain and enhanced using location highlighters.

Figure 2C:
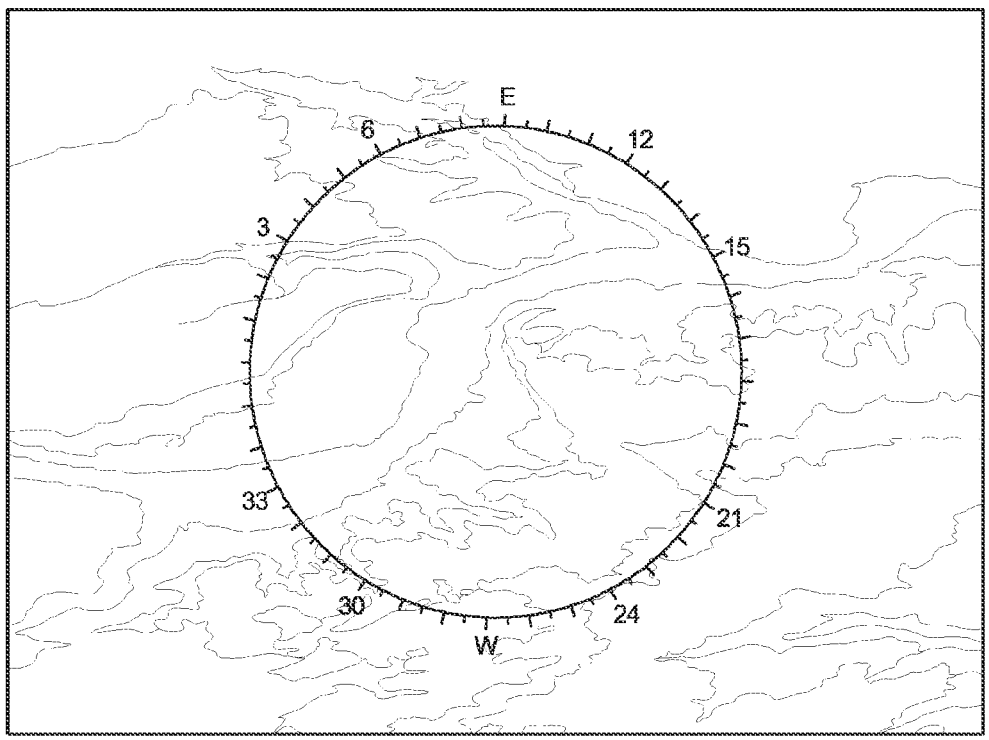
FIG. 2C presents an exemplary illustration of a strategic display unit.

FIG. 2C provides an exemplary depiction of a strategic display unit for presenting strategic information to the pilot or flight crew. FIG. 2C provides an exemplary depiction of how terrain information in the form of terrain contours may be presented on the strategic display unit. It should be noted that the strategic information depicted has been made minimal for the sake of presentation and is not indicative of the plurality of indications or information with which it may be configured. Because the indications or information shown in FIG. 2C are well-known to those skilled in the art, a discussion of the specific strategic information shown in FIG. 2C is not provided herein.

The strategic display unit may be designed to provide flexible configurations which may be tailored to the desired configuration specified by a buyer or user of the aircraft. As disclosed below, a search area and a search pattern may be depicted in a two-dimensional image of terrain may be enhanced using highlighters.

The advantages and benefits of the embodiments discussed herein may be illustrated by discussing a SAR standard employed by professionals or volunteers who conduct SAR operations. The International Maritime Organization ("IMO") and International Civil Aviation Organization ("ICAO") have jointly published the International Aeronautical and Maritime Search and Rescue ("IAMSAR") Manual, a reference incorporated herein in its entirety; at the time of this writing, the 2013 Edition of the IAMSAR Manual is comprised of three volumes.

Although the discussion herein will be drawn towards the search techniques and operations discussed in the IAMSAR Manual, the disclosed embodiments are not limited to such manual but could include other search techniques and operations not included in the manual. Moreover, those skilled in the art understand that future editions may become available and supersede the current edition; the disclosed embodiments are not limited to the current edition but could include future editions as they become available.

Volume II of the IAMSAR Manual includes sections related to the selection of search facilities, the assessment of search conditions, and the selection of search patterns such as visual search patterns, electronic search patterns, night search patterns, and land search patterns. The IAMSAR Manual discusses a plurality of visual search patterns, and three of them are identified as a sector search ("VS") pattern, an expanding square search ("SS") pattern, and a parallel sweep search ("PS") pattern. Although the discussion presented herein will be drawn to the VS, SS, and PS patterns, the embodiments disclosed herein are not limited to these but could be applied to any search pattern found within a search area.

Figure 3A:
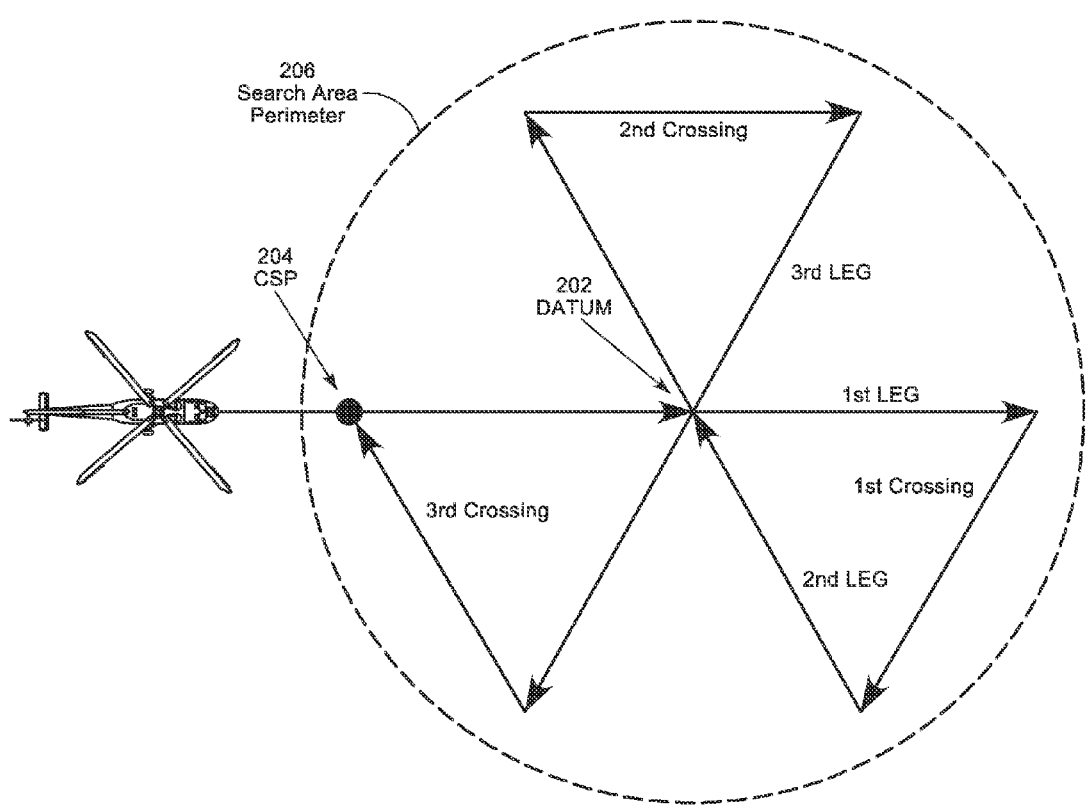
FIG. 3A presents an exemplary illustration of a sector search pattern.

As published in the IAMSAR, the VS pattern may be employed when the position of the search object is accurately known and the search area is small. Referring to FIG. 3A, the VS pattern may be used to search a circular area centered on a datum point 202 and located within the search area perimeter 206, and the search may be initiated at the CSP 204. It should be noted that a manufacturer and/or end-user may modify these points; for example, a manufacturer and/or end-user could configure the search patterns in a manner that both the datum and CSP coincide with one another.

The VS pattern is considered easy to navigate and provides intensive coverage of the area near the center, where the search object is most likely to be found. For aircraft, the radius of the VS pattern may lie between 5 nautical miles ("NM") and 20 NM. The angle between successive search legs may depend upon the radius used and the maximum track spacing at the ends of the search legs. As shown in FIG. 3A, each turn from a leg to a crossing and from a crossing to a leg of the VS pattern is 120 degrees, and the search pattern is comprised of the three legs and crossings as shown. If the SAR operation is not successful after following the pattern, a second search may be performed after rotating the pattern by 45 degrees.

Figure 3B:
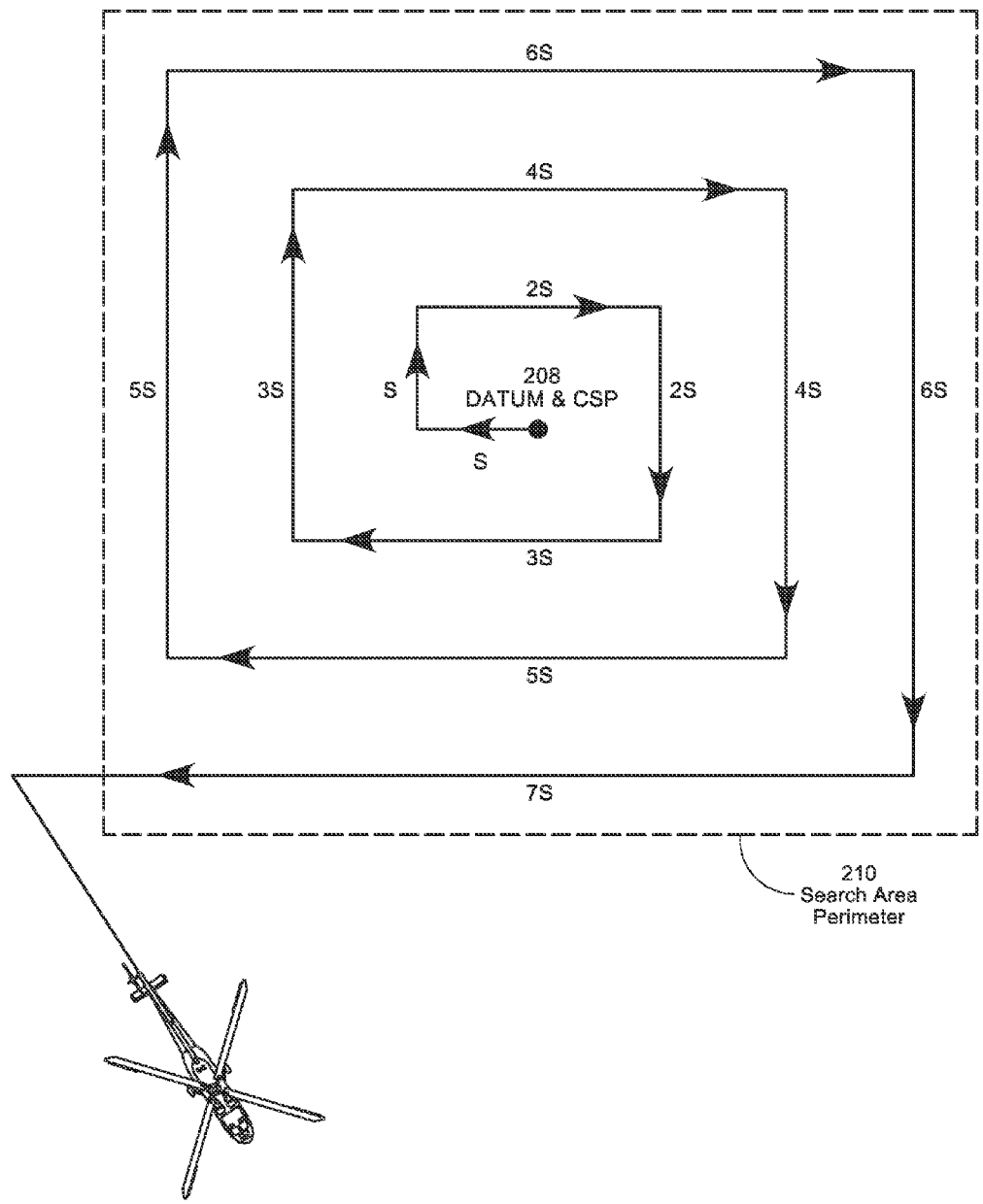
FIG. 3B presents an exemplary illustration of an expanding square search pattern.

As published in the IAMSAR, the SS pattern is a pattern that may be used when the location of the search object is known within relatively close limits. Referring to FIG. 3B, the datum and CSP 208 may be co-located (or coincide with each other). As shown in FIG. 3B, the pattern expands outward in concentric squares, providing nearly uniform coverage of the area within the search area perimeter 210 around the datum 208. The length of the first two legs may be equal to the track spacing ("S") and the lengths of every succeeding pair may be increased by another track spacing. If the datum is a short line instead of a point (not shown in FIG. 3B), the pattern may be changed to an expanding rectangle.

Figure 3C:
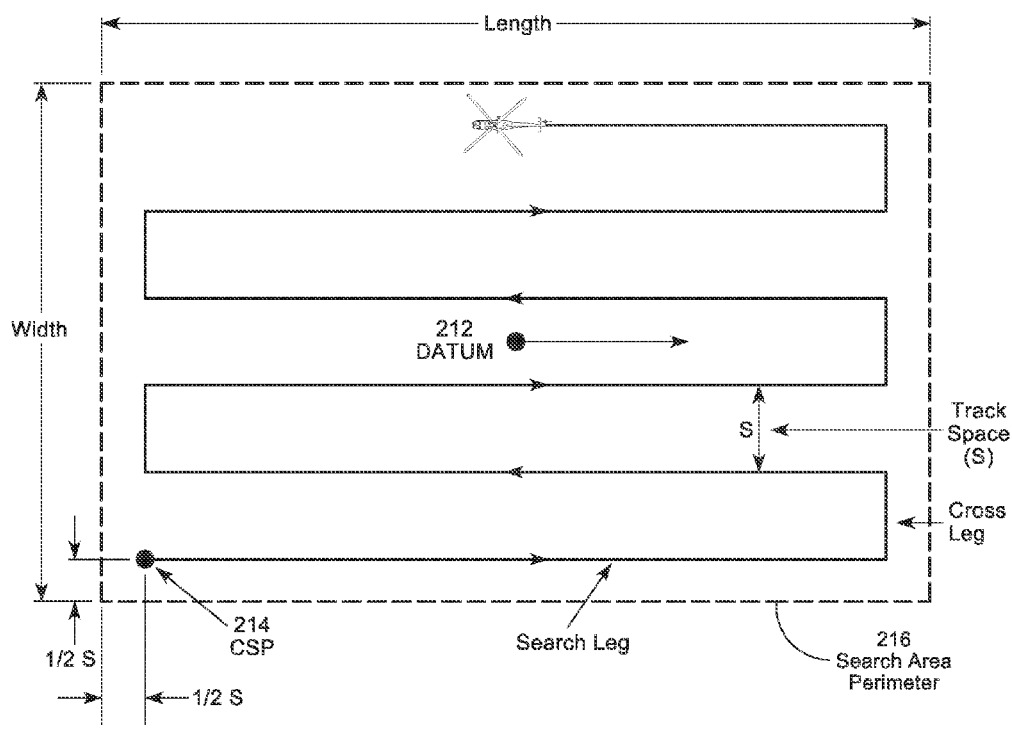
FIG. 3C presents an exemplary illustration of a parallel sweep search pattern.

As published in the IAMSAR, the PS pattern may be employed when the uncertainty in the survivor's location is large, requiring a large area to be searched with a uniform coverage. Referring to FIG. 3C, the PS pattern is most effective when used over water or reasonably flat terrain. The PS pattern covers a rectangular area within a search area perimeter 216 that could be initially centered on a datum 212 and commenced at a CSP 214.

Figure 4A:
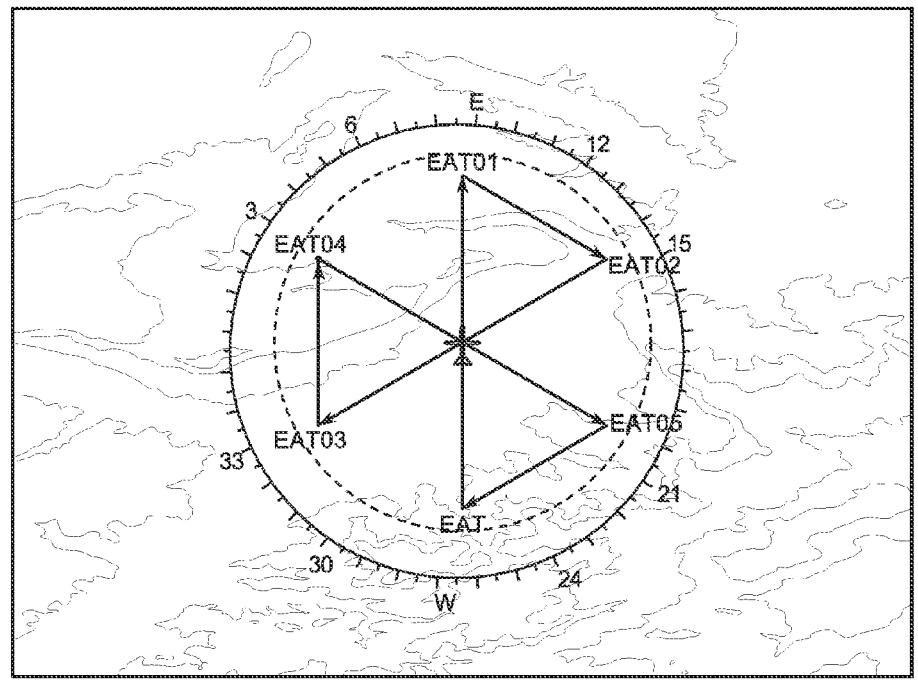
FIG. 4A presents an image of a sector search pattern depicted on a strategic display unit.
Figure 4B:
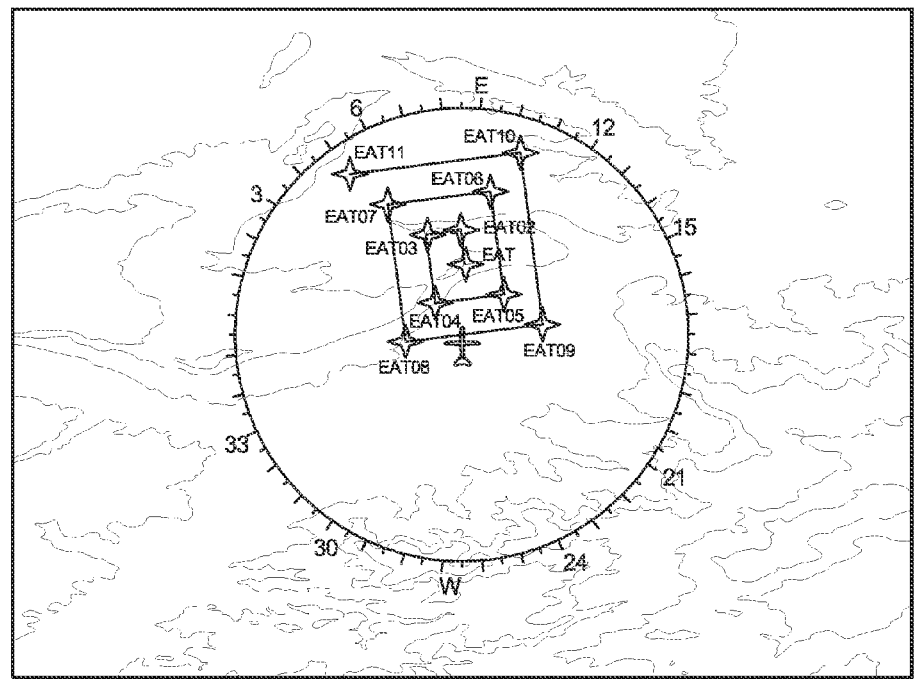
FIG. 4B presents an image of an expanding square search pattern depicted on a strategic display unit.
Figure 4C:
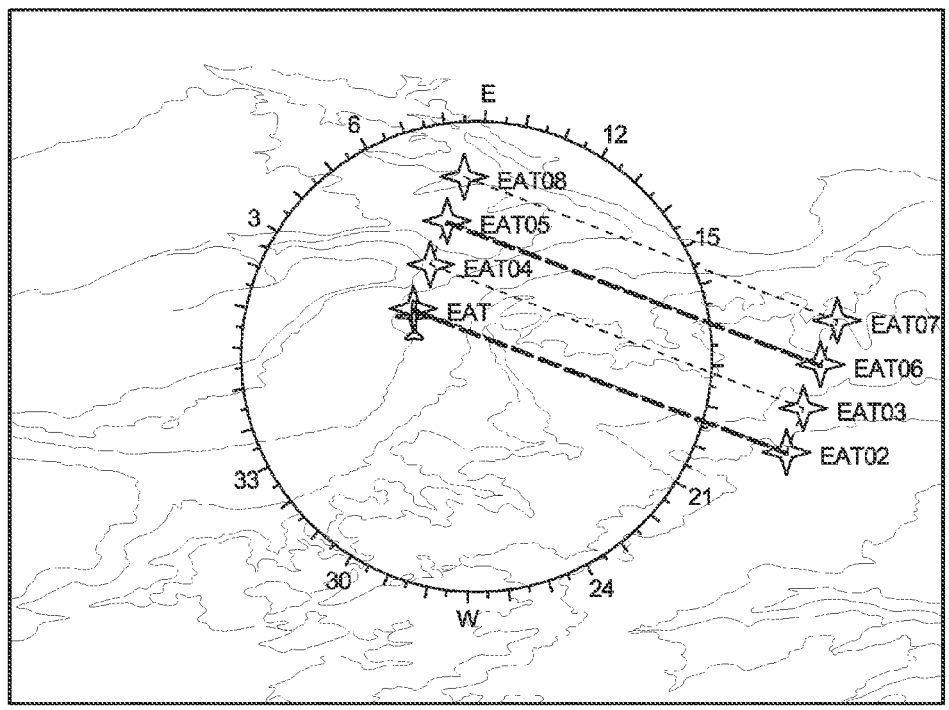
FIG. 4C presents an image of a parallel sweep search pattern depicted on a strategic display unit.

Referring to FIGS. 4A through 4C, the visual search patterns of FIGS. 3A through 3C, respectively, may be generated and presented on a strategic display unit and against terrain contours. If provided with search parameters such as a datum and a size (or initial size) of a search area (and other search parameters) by the search data source 130, for instance, the IG 140 could construct the pattern comprised of a plurality of legs defined by waypoints that may be determined through the use of algorithm(s) known to those skilled in the art.

For the VS pattern shown in FIG. 4A, waypoints may be provided or computed. The CSP is located at the waypoint EAT; the first leg is defined by waypoints EAT and EAT01; the first crossing leg is defined by waypoints EAT01 and EAT02; the second leg is defined by waypoints EAT02 and EAT03; the second crossing leg is defined by waypoints EAT03 and EAT04; the third leg is defined by waypoints EAT04 and EAT05; and the third crossing leg is defined by waypoints EAT05 and EAT.

For the SS pattern shown in FIG. 4B, waypoints may be provided or computed. The CSP is located at the waypoint EAT; the first S leg is defined by waypoints EAT and EAT02; the second S leg is defined by waypoints EAT02 and EAT03; the first 2S leg is defined by waypoints EAT03 and EAT04; the second 2S leg is defined by waypoints EAT04 and EAT05; the first 3S leg is defined by waypoints EAT05 and EAT06; the second 3S leg is defined by waypoints EAT06 and EAT07; the first 4S leg is defined by waypoints EAT07 and EAT08; the second 4S leg is defined by waypoints EAT08 and EAT09; the first 5S leg is defined by waypoints EAT09 and EAT10; the second 5S leg is defined by waypoints EAT10 and EAT11.

For the PS pattern shown in FIG. 4C, waypoints may be provided or computed. The CSP is located at the waypoint EAT; the first search leg is defined by waypoints EAT and EAT02; the first crossing leg is defined by waypoints EAT02 and EAT03; the second search leg is defined by waypoints EAT03 and EAT04; the second crossing leg is defined by waypoints EAT04 and EAT05; the third search leg is defined by waypoints EAT05 and EAT06; the third crossing leg is defined by waypoints EAT06 and EAT07; and the fourth search leg is defined by waypoints EAT07 and EAT 08.

Figure 5A:
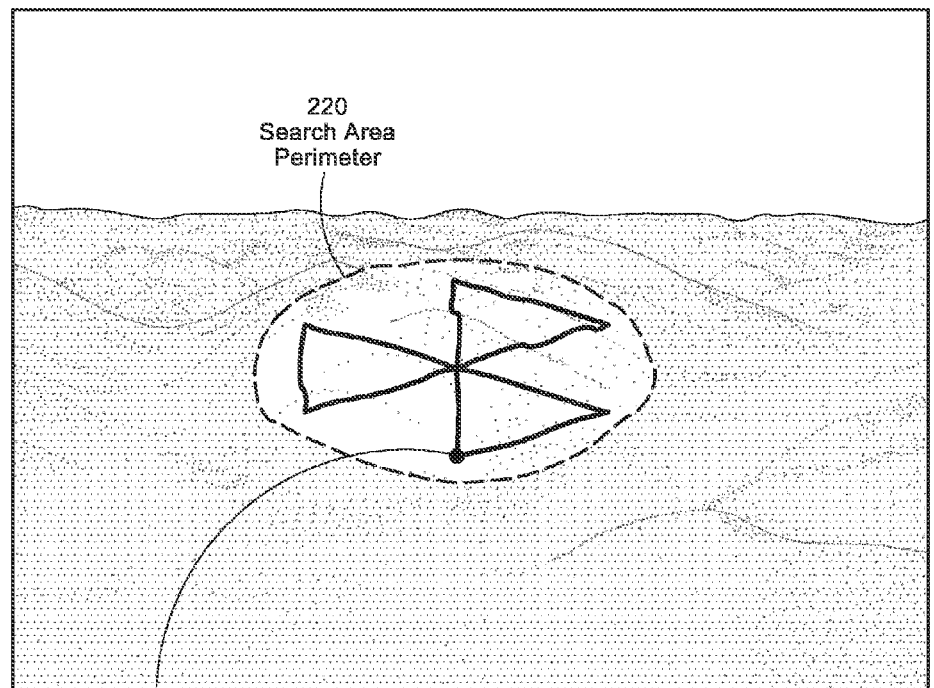
FIG. 5A presents an image of a sector search pattern depicted on a tactical display unit.
Figure 5B:
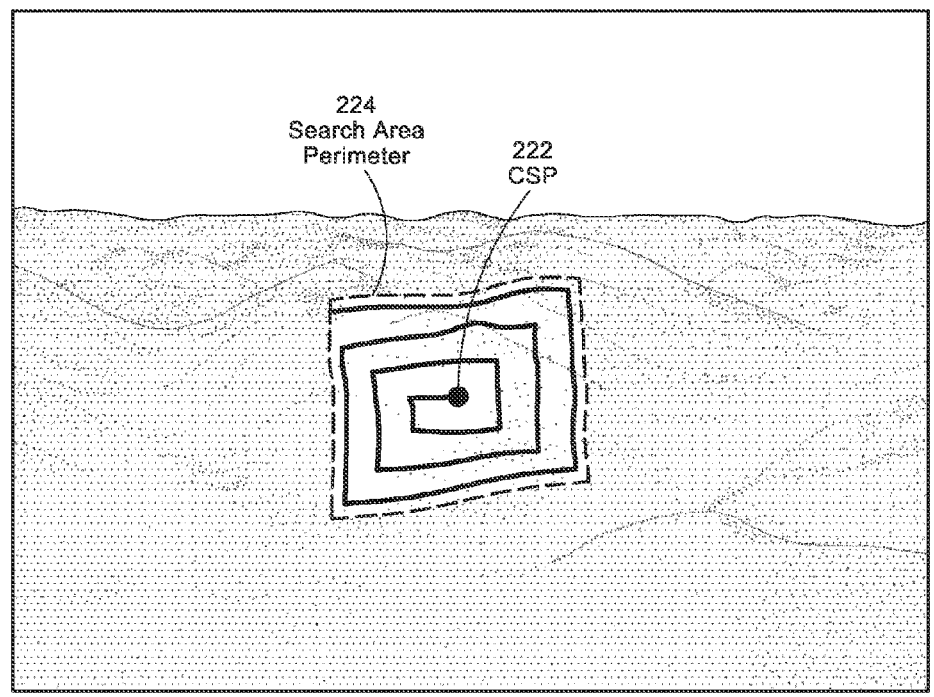
FIG. 5B presents an image of an expanding square search pattern depicted on a tactical display unit.
Figure 5C:
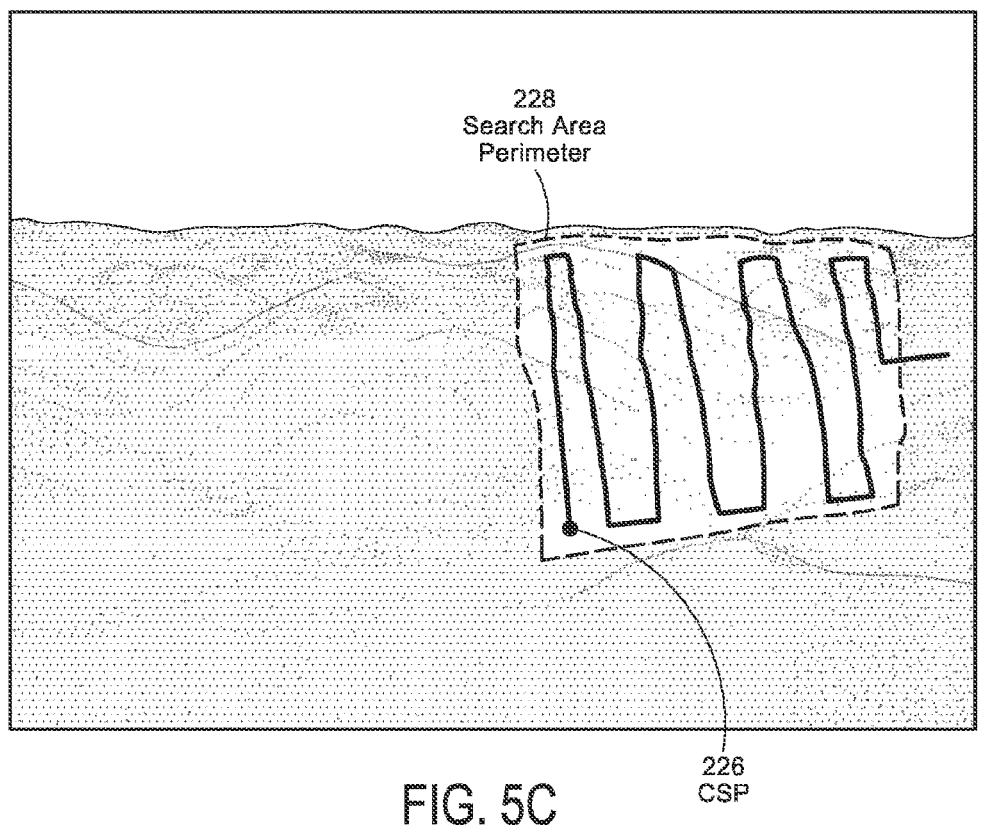
FIG. 5C presents an image of a parallel sweep search pattern depicted on a tactical display unit.

Referring to FIGS. 5A through 5C, the visual search patterns of FIGS. 3A through 3C, respectively, may be generated and presented on a tactical display unit and against a three-dimensional perspective of a scene located outside an aircraft. If provided with search parameters such as a datum and a size (or initial size) of a search area (and other search parameters) by the search data source 130, for instance, the IG 140 could construct the pattern comprised of a plurality of legs defined by waypoints that may be determined through the use of algorithm(s) known to those skilled in the art. Once the plurality of legs have been determined, ground tracks corresponding to and/or lying directly underneath the legs may be determined and presented ground tracks "running" along with the terrain.

It should be noted that, although the discussion of the tactical display unit will be drawn towards an HDD unit, the embodiments disclosed herein include a HUD unit. Furthermore, although the three-dimensional perspective is drawn towards an image presenting an egocentric view, the embodiments herein may be applied in an image presenting an exocentric view.

For the VS pattern shown in FIG. 5A, waypoints may be provided or computed (waypoint symbology has been omitted from the image) from which the locations of pattern corners may be determined, a plurality of legs may be defined, and a plurality of ground tracks may be generated and presented. As indicated by the CSP 218, the pilot may be presented with search commencement location. As indicated by the search area perimeter 220, a location highlighter has been employed to highlight the location of the search area of the VS pattern and to make the search area visually conspicuous from the rest of the three-dimensional perspective.

Location highlighters and the employment thereof have been disclosed by Yum et al in U.S. Pat. No. 8,094,188 ("the Yum reference"), a reference incorporated herein in its entirety. As stated in the Yum reference, the location highlighter could be comprised of enhancing effects such as, but not limited to, shading, transparency, translucency, opacity, texture-mapping, bump-mapping, fogging, shadowing, patterns, colors, or any combination thereof. For example, transparency could be one of a plurality of enhancing effects for location highlighter; that is, an outline of terrain "behind" or "underneath" the search area location highlighter could still be visible to the pilot. In another example, a CSP location highlighter highlighting the location of the CSP could highlight the "outer surface" depicts a dome as the illuminating symbology having one color (e.g., white), but the outer surface could be shown as having patterns. In another example, a CSP location highlighter could begin fading away as the aircraft approaches the CSP by, for example, varying the level or degree of such enhancing effect as a function of distance. The utilization and employment of enhancing effects are known to those skilled in the art.

Another enhancing effect could be color. On a display unit capable of displaying colors, a location highlighter could be enhanced by color on a display where colors may be presented, and such color could depend on the distance between the highlighted location and the aircraft, where each color could represent a specific range to the location. In another example, the search area location highlighter could be shown in a different color from the CSP location highlighter; moreover, each of these location highlighters could be shown in different colors than other location highlighters appearing in the scene but outside the search area. In another example, an identifier could remain steady or flash intermittently, where such flashing could depend on the distance between the object and the aircraft, where such flashing could represent a specific range to the object. Each of these examples are intended to provide an example of enhancements which highlight the locations of objects, and are not intended to provide a limitation or an exhaustive list to the embodiments discussed herein.

For the SS and PS patterns of FIGS. 5B and 5C, respectively, waypoints may be provided or computed from which the locations of pattern corners may be determined, a plurality of legs may be defined, and a plurality of ground tracks may be generated and presented. As indicated by the CSPs 222 and 226, the pilot may be presented with search commencement locations of the SS and PS patterns, respectively. As indicated by the search area perimeters 224 and 228, location highlighters have been employed to highlight the locations of the search areas of the SS and PS patterns, respectively, and to make the search area visually conspicuous from the rest of the three-dimensional perspective.

Figure 6A:
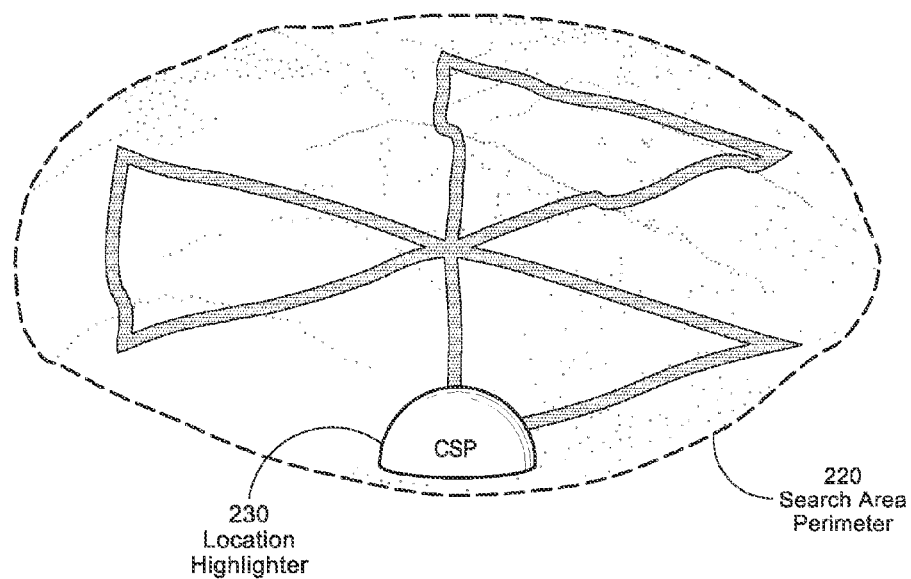
FIG. 6A presents an image of a CSP location highlighter for a sector search pattern.
Figure 6B:
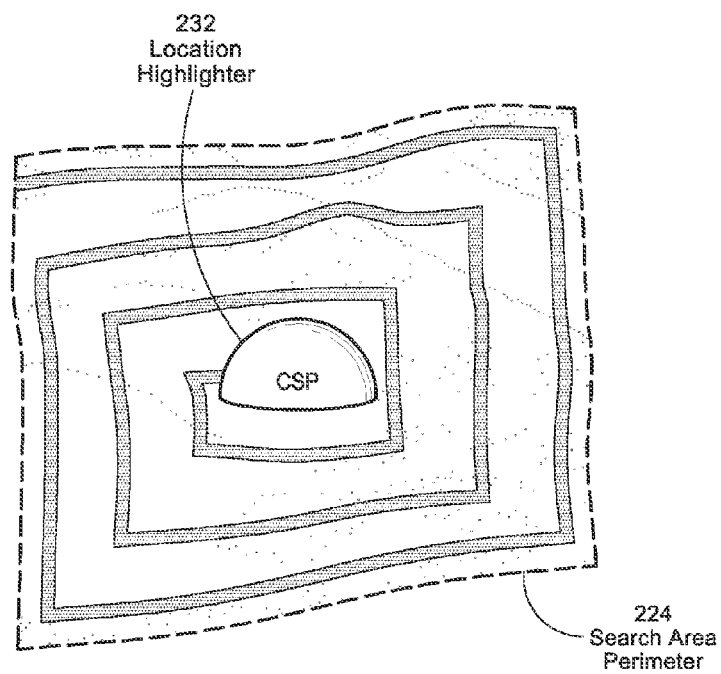
FIG. 6B presents an image of a CSP location highlighter for an expanding square search pattern.
Figure 6C:
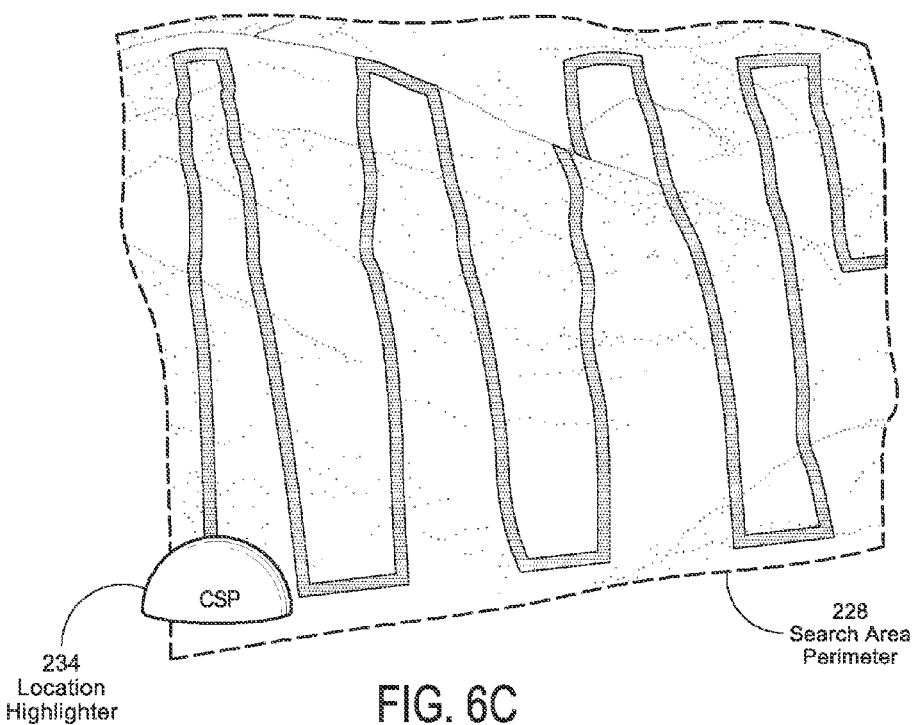
FIG. 6C presents an image of a CSP location highlighter for a parallel sweep search pattern.
Figure 6D:
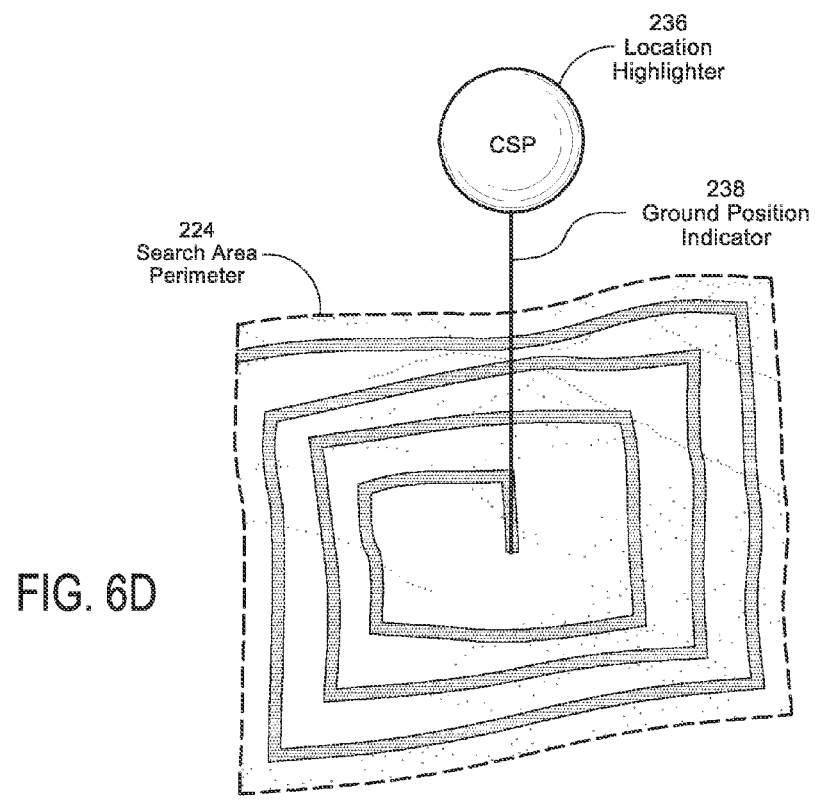
FIG. 6D presents an image of a CSP location highlighter and ground position indicator for an expanding square search pattern.

Referring to FIGS. 6A through 6D, the search areas of FIGS. 5A through 5C have been isolated from the three-dimensional perspective of the entire scene to illustrate the use of location highlighters for highlighting the CSP to the pilot, where such CSP may be configured as a function of the distance between the aircraft and the CSP so that it may fade away as the aircraft approaches the CSP. As shown in FIG. 6A, the location of the CSP of the search pattern of FIG. 5A is indicated by a CSP location highlighter 230. As shown in FIG. 6B, the location of the CSP of the search pattern of FIG. 5B is indicated by a CSP location highlighter 232. As shown in FIG. 6C, the location of the CSP of the search pattern of FIG. 5C is indicated by a CSP location highlighter 234. As shown in FIG. 6D, the location of the CSP of the search pattern of FIG. 5B is indicated by a CSP location highlighter 236 and a ground position indicator 238. The ground position indicator and the employment thereof have been disclosed by Chiew et al in U.S. Pat. No. 7,965,202, a reference incorporated herein in its entirety.

After receiving data representative of the search area, the IG 140 may be programmed or configured to retrieve elevations of object cells found within the search from the object data source 120. Then, each of these elevations may be compared against an altitude to determine the presence of threatening terrain that may be encountered while conducting SAR operations within the search area. This altitude could be the current altitude of the aircraft or another altitude selectable by the pilot or another person participating in the SAR operation through, for instance, the search data source 130.

A manufacturer and/or end-user may define one or more terrain threat levels, where such levels could be fixed, variable, or both. For example, a first terrain threat level could be fixed at 500 feet, and a second terrain level could be defined as 1,000 feet. The IG 140 could determine the presence of a first threat level of an object cell where the difference between the altitude and the elevation of the object cell is less than or equal to 500 feet and the presence of a second threat level where the difference is greater than or equal to 500 feet but less than or equal to 1,000 feet.

In addition to being fixed, terrain threat levels could be variable. For example, the terrain clearance altitudes and alerting criteria employed in a Terrain Awareness and Warning System ("TAWS") could be used to define one or more variable terrain threat levels. One set of TAWS terrain clearance altitudes and alerting criteria has been published by the United States Federal Aviation Administration ("FAA") in a Technical Standard Order ("TSO") identified as TSO-151c, a reference incorporated herein in its entirety; other aviation regulatory authorities could develop separate minimum performance standards which differ from those published by the FAA. For many of the altitudes and alerting criteria published in TSO-151c, these may be variable and dependent upon the aircraft's current phase of flight and flight attitude. If so, then data representative of the alerting criteria could be provide to the IG 140 and used in determining the presence of terrain threat levels.

Figure 7A:
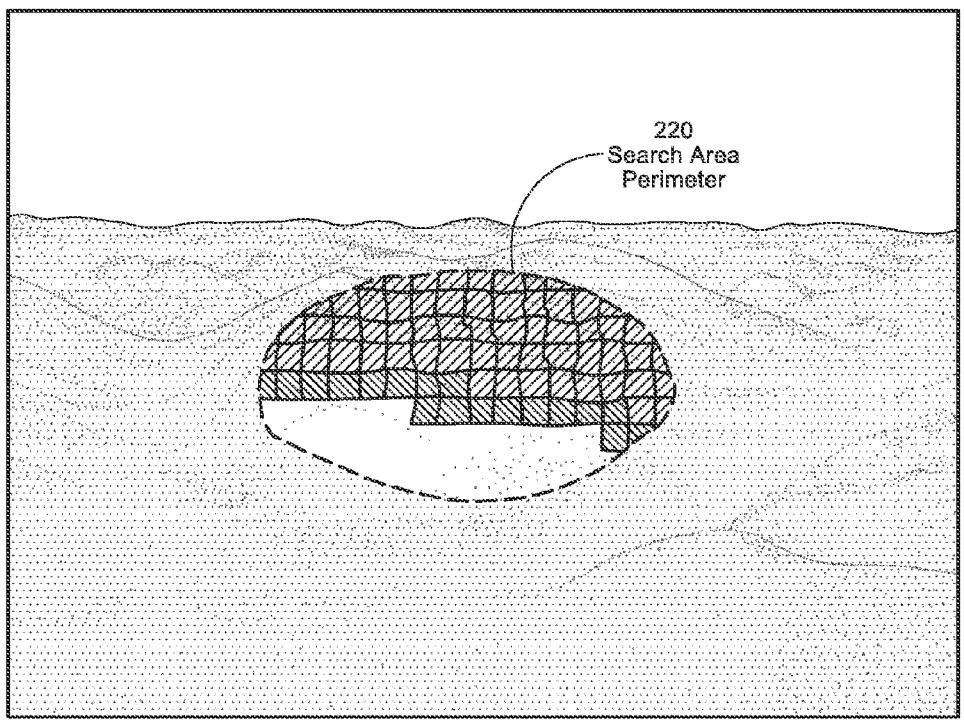
FIG. 7A presents an image of location highlighters for a search area of a sector search pattern.
Figure 7B:
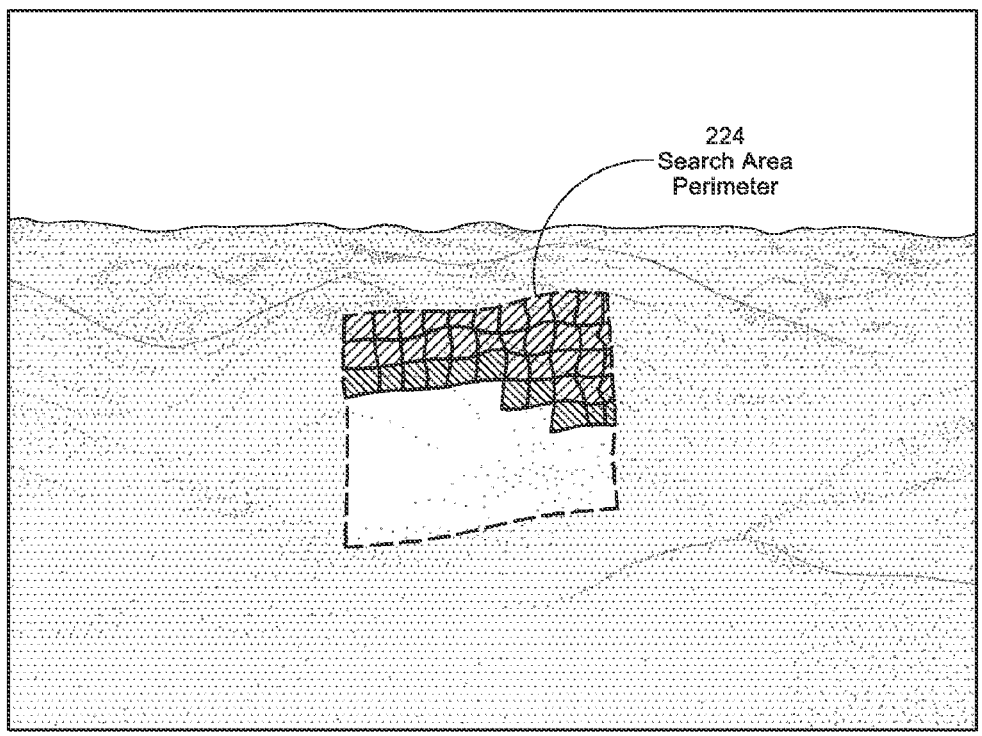
FIG. 7B presents an image of location highlighters for a search area of an expanding square search pattern.
Figure 7C:
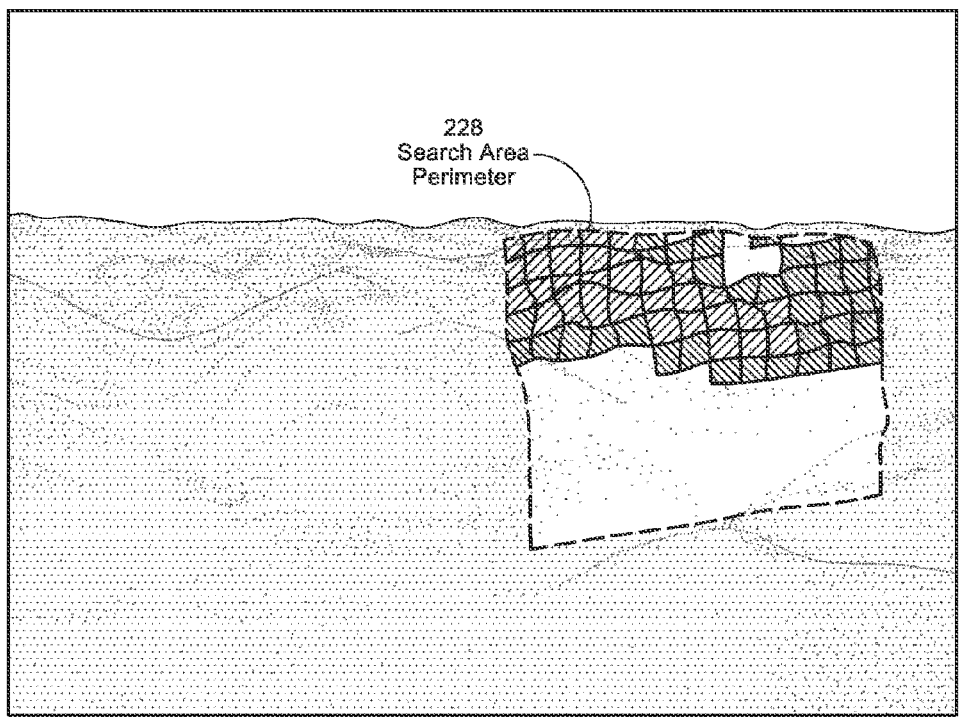
FIG. 7C presents an image of location highlighters for a search area of a parallel sweep search pattern.

Referring to FIGS. 7A through 7C, assume that a configuration employing two threat levels has been selected by a manufacturer and/or end-user. Once the elevations of object cells located within the search area have been retrieved, they may be compared against an altitude to see if the result of the comparison meets one of the two threat levels. As shown in FIGS. 7A through 7C, object cells falling within the search areas of FIGS. 5A through 5C, respectively, and meeting one of the two threat levels have been identified. Besides the search area location highlighter employed in FIGS. 5A through 5C, additional location highlighters have been employed. A search area could be configured with a plurality of location highlighters, where one location highlighter could correspond to one threat level. As shown in FIGS. 7A through 7C, one location highlighter has been applied to object cells identified with a first threat level, a second location highlighter has been applied to object cells identified with a second threat level, and a third location highlighter (which happens to be the search area location highlighter of FIGS. 5A through 5C) has been applied to object cells identified with a third threat level, that is, those object cells not identified as being first threat level object cells and second threat level object cells.

Figure 8A:
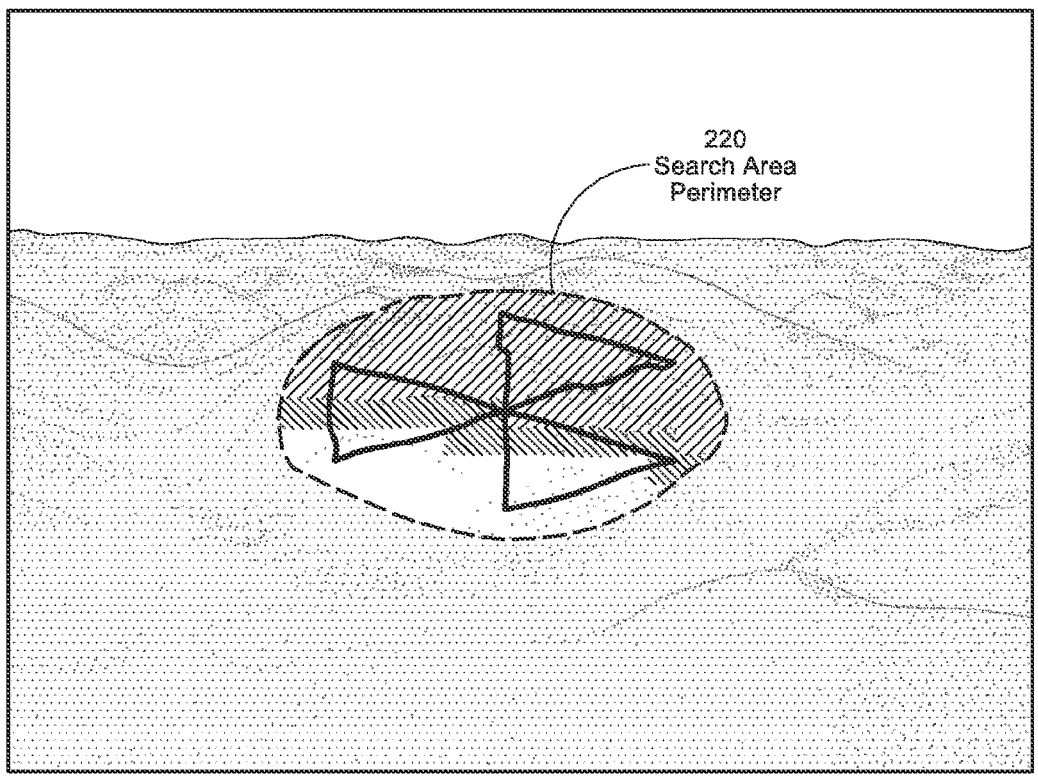
FIG. 8A presents an image of search area location highlighters and a sector search pattern.
Figure 8B:
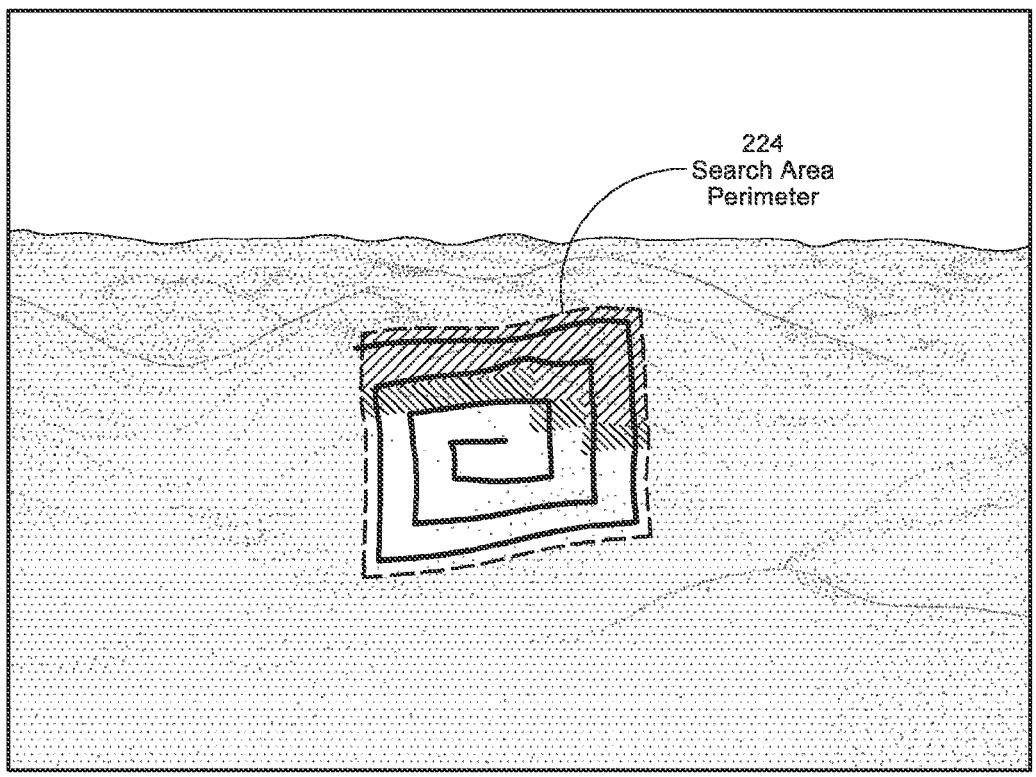
FIG. 8B presents an image of search area location highlighters and an expanding square search pattern.
Figure 8C:
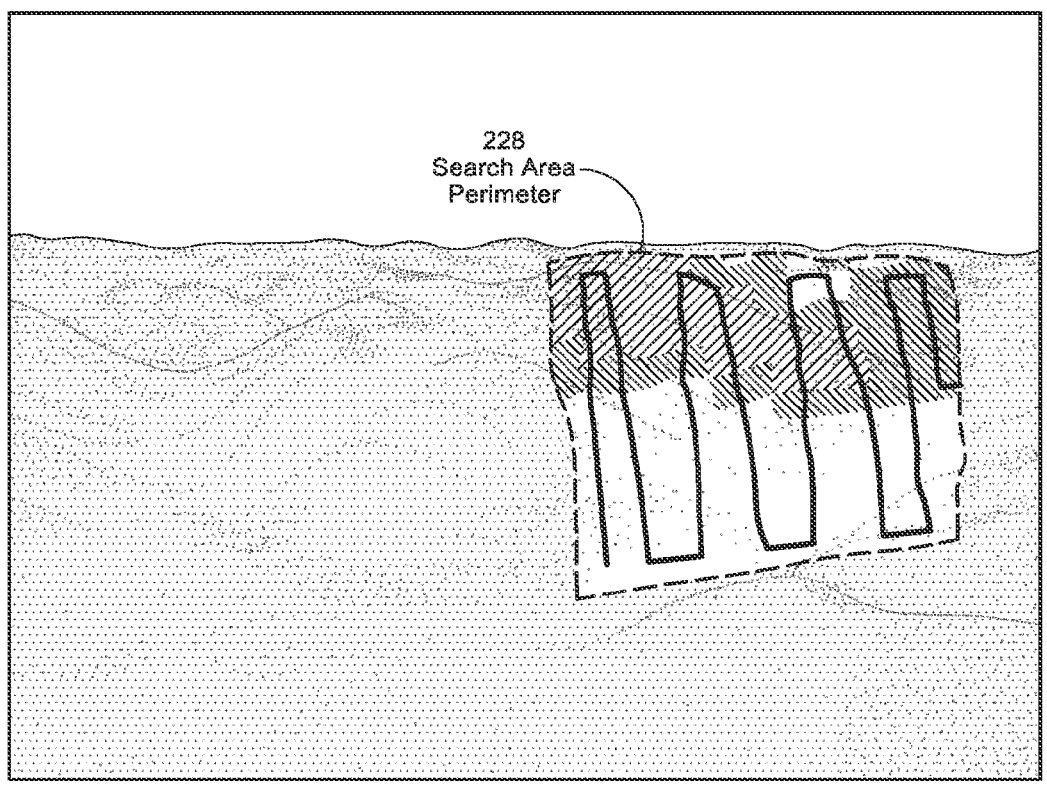
FIG. 8C presents an image of search area location highlighters and a parallel sweep search pattern.

Referring to FIGS. 8A through 8C, the search patterns falling within the search areas of FIGS. 5A through 5C, respectively, have been added to the search areas of FIGS. 7A through 7C, respectively. When presented with a plurality of search area location highlighters, a pilot flying the search pattern or preparing to fly the search pattern may be advised of the presence of threatening terrain by viewing the appearance of the search area location highlighters as he or she travels over the ground tracks and/or along the legs of the search pattern.

Figure 9A:
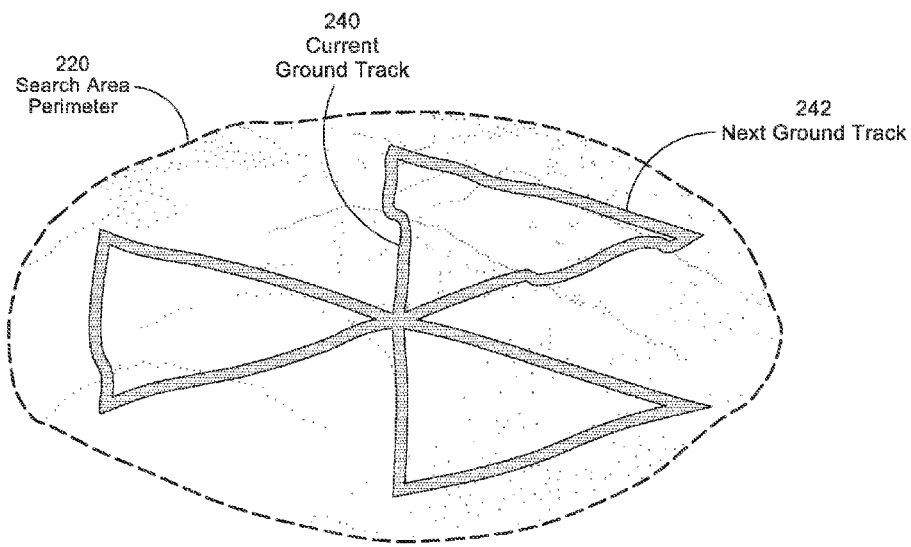
FIG. 9A presents an image of current and next ground tracks of a sector search pattern.
Figure 9B:
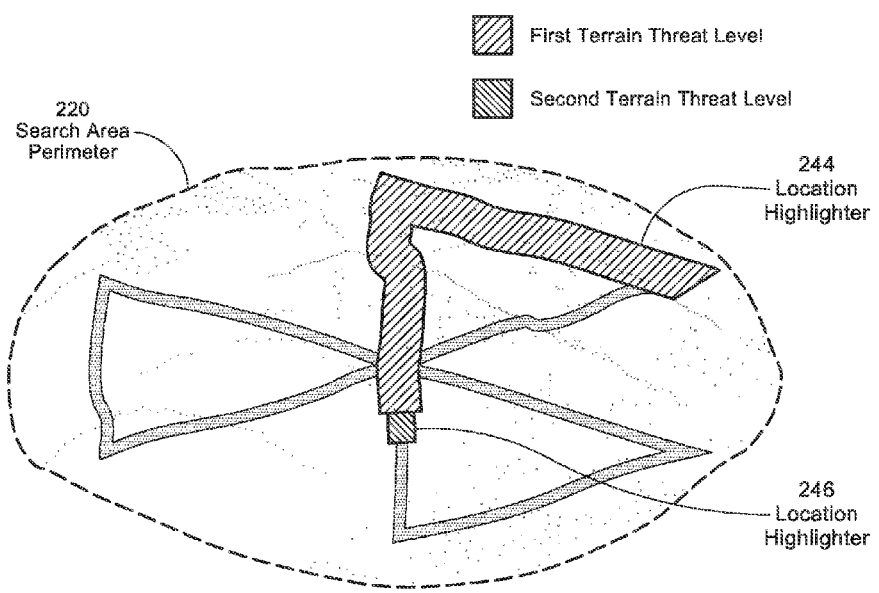
FIG. 9B presents an image of ground track location highlighters of a sector search pattern.

In another embodiment, some or all of the ground tracks of a search pattern could be configured with a plurality of location highlighters, where each location highlighter could correspond to one threat level. Referring to FIG. 9A, assume an aircraft is flying along the current ground track 240 of the search pattern of FIG. 5A and will turn to the right 120 degrees onto the next ground track 242. As shown in FIG. 9B, location highlighters have been employed along the current and next ground tracks, where the configuration of the location highlighter is dependent upon the terrain threat level. As observed, location highlighter 244 highlights the locations along the current and next ground tracks corresponding to a first terrain threat level, and location highlighter 246 highlights the locations along the current track corresponding to a second terrain threat level.

Figure 9C:
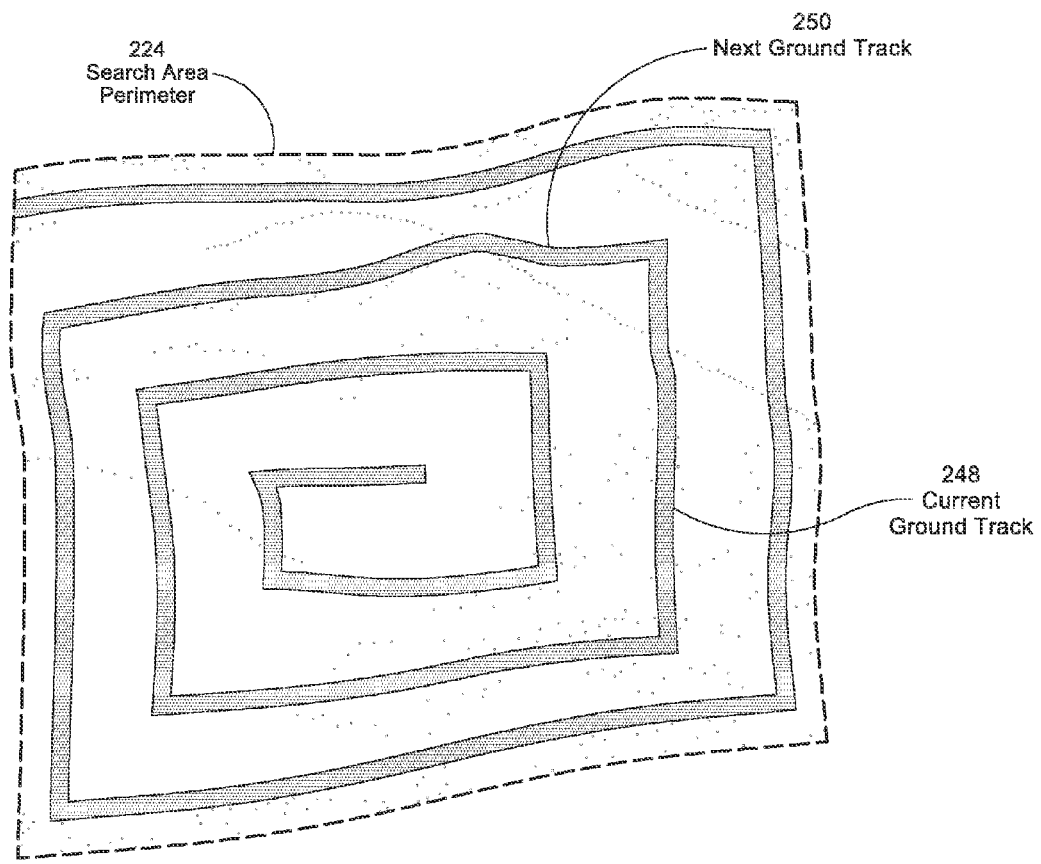
FIG. 9C presents an image of current and next ground tracks of an expanding square search pattern.
Figure 9D:
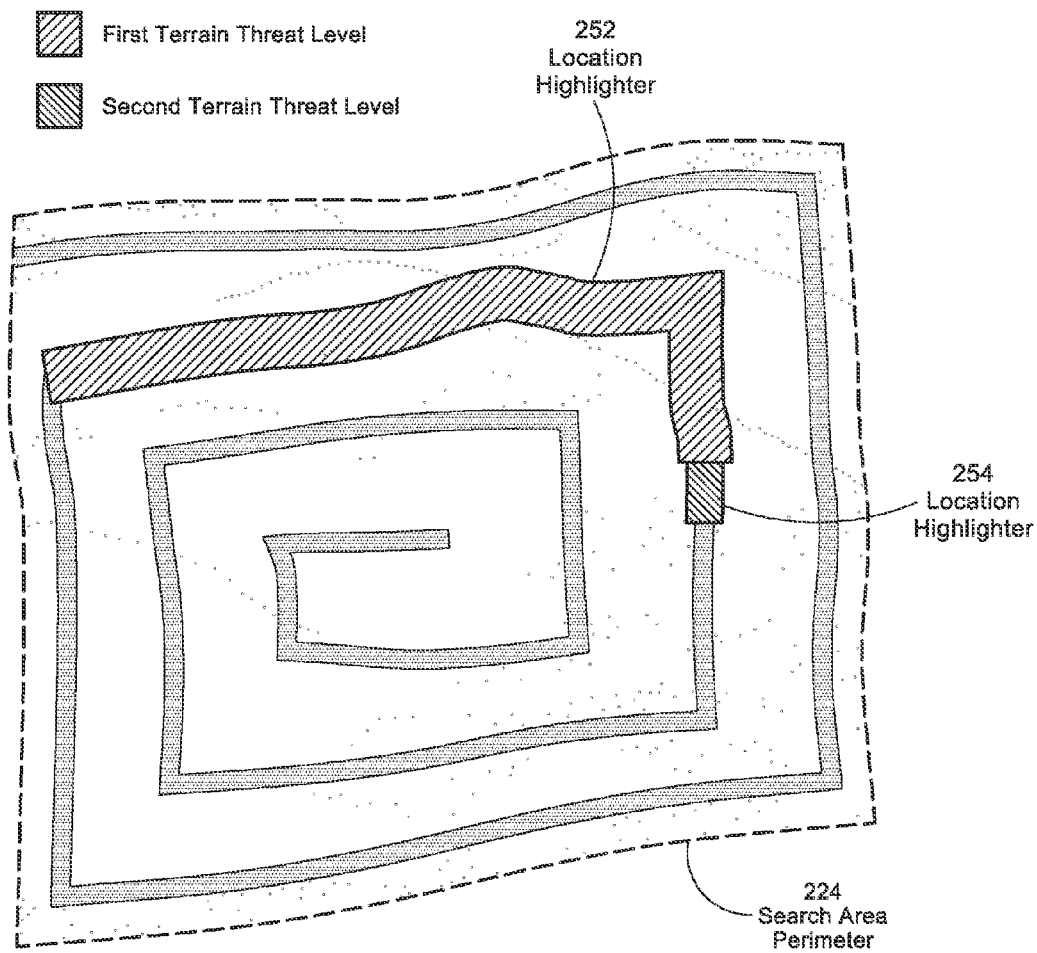
FIG. 9D presents an image of ground track location highlighters of an expanding square search pattern.

Referring to FIG. 9C, assume an aircraft is flying along the current ground track 248 of the search pattern of FIG. 5B and will turn to the left 90 degrees onto the next ground track 250. As shown in FIG. 9D, location highlighters have been employed along the current and next ground tracks. Location highlighter 252 highlights the locations along the current and next ground tracks corresponding to a first terrain threat level, and location highlighter 254 highlights the locations along the current track corresponding to a second terrain threat level.

Figure 9E:
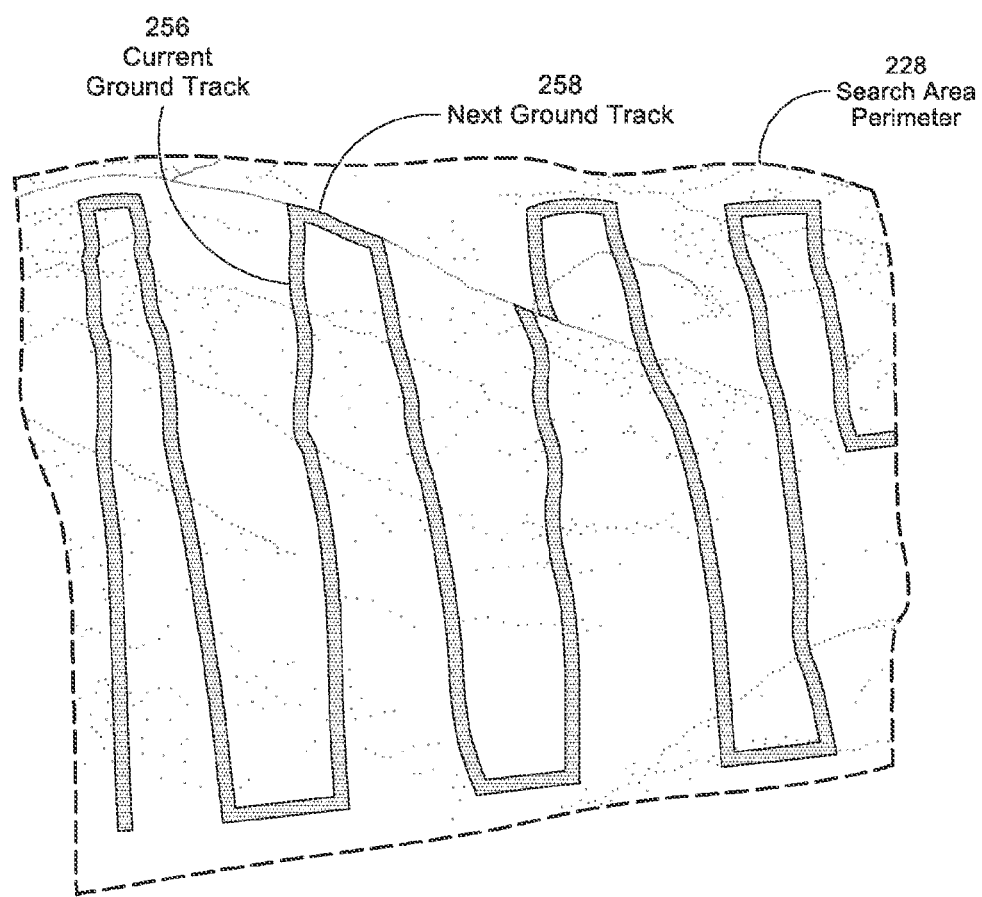
FIG. 9E presents an image of current and next ground tracks of a parallel sweep search pattern.
Figure 9F:
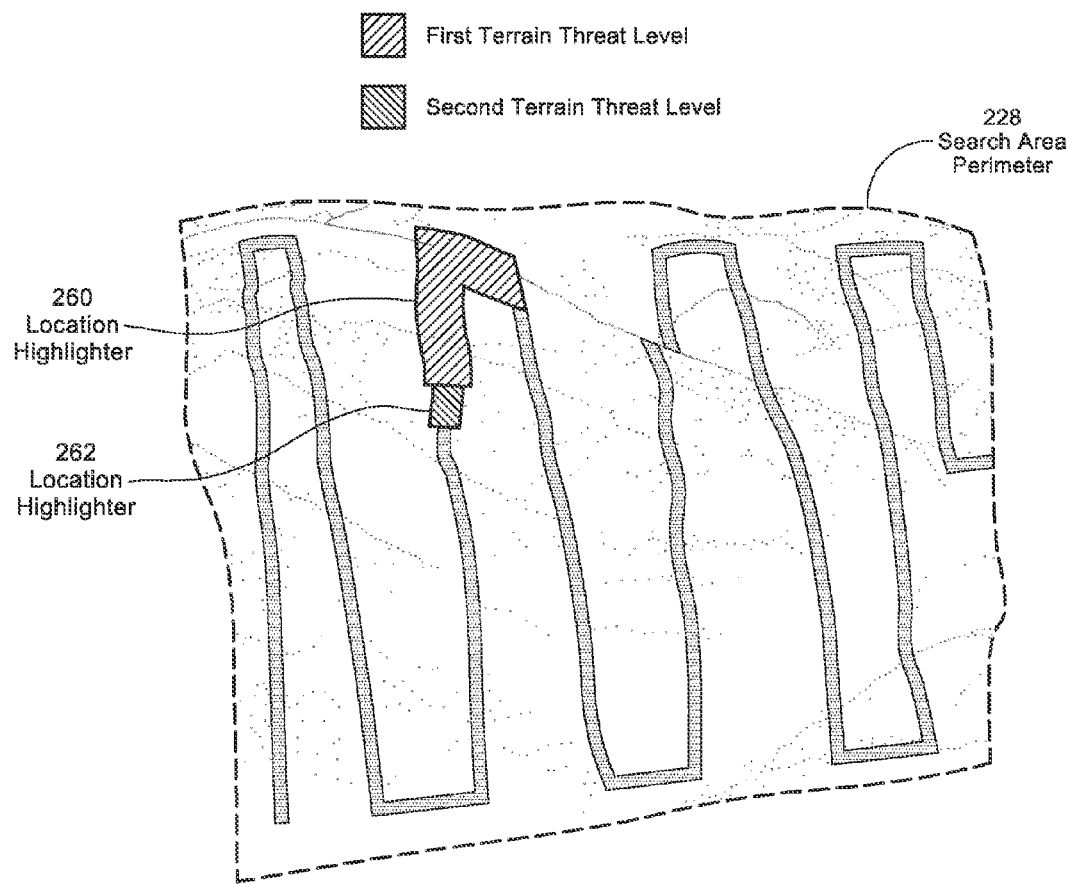
FIG. 9F presents an image of ground track location highlighters of a parallel sweep search pattern.

Referring to FIG. 9E, assume an aircraft is flying along the current ground track 256 of the search pattern of FIG. 5C and will turn to the right approximately 90 degrees onto the next ground track 258. As shown in FIG. 9F, location highlighters have been employed along the current and next ground tracks. Location highlighter 260 highlights the locations along the current and next ground tracks corresponding to a first terrain threat level, and location highlighter 262 highlights the locations along the current track corresponding to a second terrain threat level.

It should be noted that, although the location highlighters disclosed above have been drawn to an image presented on a tactical display unit, the disclosures herein are not limited to such display unit. Rather, the location highlighters disclosed herein may be applied to images presented on a strategic display unit.

Figure 10:
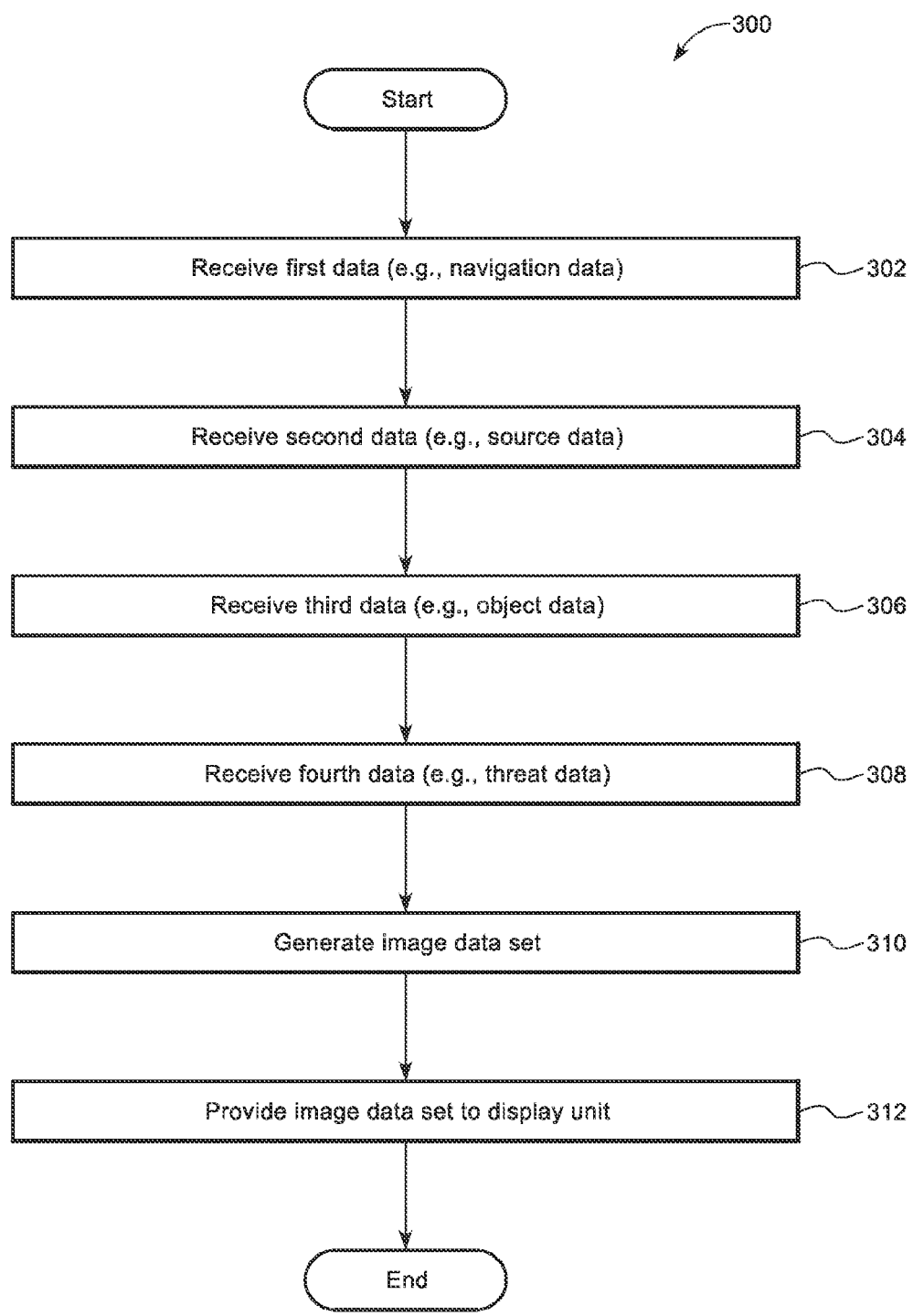
FIG. 10 provides a flowchart illustrating a method for generating surface information presentable on a display unit.

FIG. 10 depicts flowchart 300 disclosing an example of a method for generating and/or presenting surface information on a display unit, where the IG 140 may be programmed or configured with instructions corresponding to the following modules embodied in the flowchart. Also, the IG 140 may be a processor of a physical or tangible module such as, but not limited to, a printed circuit board having one or more input interfaces to facilitate the two-way data communications of the IG 140, i.e., to facilitate the receiving and providing of data. As necessary for the accomplishment of the following modules embodied in the flowchart, the receiving of data is synonymous and/or interchangeable with the retrieving of data, and the providing of data is synonymous and/or interchangeable with the making available or supplying of data.

The flowchart begins with module 302 with the receiving of first data. The first data could be received from the navigation data source 110 and comprised of navigation data representative of at least aircraft position and heading, where aircraft position could be comprised of latitude, longitude, and altitude information.

The flowchart continues with module 304 with the receiving of second data. The second data could be received from the object data source 130 and comprised of search data representative of at least a reference location such as a datum and/or a CSP; a targeted area that could be comprised of a search area targeted for a specific operation such as, but not limited to, a search-and-rescue operation; and a pattern comprised of a plurality of legs and/or ground tracks corresponding to the legs.

The flowchart continues with module 306 with the retrieving of third data. Based upon the targeted area, the third data could be retrieved from the object data source 120 and comprised of object data representative of a plurality of elevations of object cells located within the targeted area.

The flowchart continues with module 308 with the determining of fourth data. Based upon an altitude and the elevations of the retrieved object cells, the fourth data could be representative of a threat level for each object cell based upon the difference between the altitude and object cell elevation. In one embodiment, the altitude could be the current aircraft altitude provided in the aircraft position. In another embodiment, the altitude could be selectable altitude that could be provided by, for instance, the search data source 130.

The flowchart continues with module 310 with the generating of an image data set. Based upon the first data (e.g., navigation data), second data (e.g., search data), third data (e.g., object data), and fourth data (e.g., threat data), the image data set could be representative of an image comprised of one or more first location highlighters and one or more second location highlighters. In one embodiment, each first location highlighter could be comprised of a search area location highlighter and depend upon a threat level determined for an object cell as discussed above. In another embodiment, each second location highlighter could be comprised of a ground track location highlighter and depend upon a threat level of the object cell over which the ground track traverses.

The flowchart continues with an optional module 312 with the providing of the image data set to one or more display units of a display system configured to receive the image data set. After being received, the image of one or more first location highlighters (e.g., search area location highlighters) and one or more second location highlighters (e.g., ground track location highlighters) represented in the image data set may be presented, for instance, as an overlay on each display unit. As such, the attention of the viewer may be drawn to the presence of terrain. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for generating surface information presentable on at least one display unit, such system comprising:
    a source of first data;
    a source of second data;
    a source of third data; and
    an image generator configured to
        receive first data representative of at least aircraft position and heading;
        receive second data representative of at least
            a reference location,
            a targeted area, and
            a plurality of legs located within the targeted area, where
                the reference location, the targeted area, and the plurality of legs are defined independently of aircraft position and heading;
        retrieve third data representative of a plurality of object cell elevations within the targeted area;
        determine fourth data representative of a threat level for each object cell based upon at least an altitude and object cell elevation; and
        generate an image data set based upon the first data, the second data, the third data, and the fourth data, where the image data set is representative of an image comprised of
            at least first location highlighter, and
            at least one second location highlighter located within at least one first location highlighter.

2. The system of claim 1, wherein the source of first data and the source of the second data are comprised of the same source.

3. The system of claim 1, wherein the aircraft position is comprised of the altitude.

4. The system of claim 1, wherein the search data is further representative of the altitude.

5. The system of claim 1, wherein
    the reference location is comprised of
        a search pattern datum, or
        a commencement search point.

6. The system of claim 1, wherein each first location highlighter corresponds to one threat level.

7. The system of claim 1, wherein each second location highlighter corresponds to one threat level.

8. The system of claim 1, further comprising:
    at least one display unit configured to
        receive the image data set from the image generator, and
        present the image represented in the image data set on each display unit.

9. A device for generating surface information presentable on at least one display unit, such device comprising:
    an image generator configured to
        receive first data representative of at least aircraft position and heading;
        receive second data representative of at least
            a reference location,
            a targeted area, and
            a plurality of legs located within the targeted area, where
                the reference location, the targeted area, and the plurality of legs are defined independently of aircraft position and heading;
        retrieve third data representative of a plurality of object cell elevations within the targeted area;
        determine fourth data representative of a threat level for each object cell based upon at least an altitude and object cell elevation; and
        generate an image data set based upon the first data, the second data, the third data, and the fourth data, where the image data set is representative of an image comprised of
            at least first location highlighter, and at least one second location highlighter located within at least one first location highlighter.

10. The device of claim 1, wherein
the aircraft position is comprised of the altitude, or
the second data is further representative of the altitude.

11. The device of claim 9, wherein
the reference location is comprised of
   a search pattern datum, or
   a commencement search point.

12. The device of claim 9, wherein each first location highlighter corresponds to one threat level.

13. The device of claim 9, wherein each second location highlighter corresponds to one threat level.

14. The device of claim 9, where
the image generator is further configured to
   provide the image data set to at least one display unit, whereby
      the image represented in the image data set is presented on each display unit.

15. A method for generating surface information presentable on at least one display unit, such method comprising:
   receiving first data representative of at least aircraft position and heading;
   receiving second data representative of at least
      a reference location,
      a targeted area, and
      a plurality of legs located within the targeted area, where the reference location, the targeted area, and the plurality of legs are defined independently of aircraft position and heading;
   retrieving object data representative of a plurality of object cell elevations within the targeted area;
   determining threat data representative of a threat level for each object cell based upon at least an altitude and object cell elevation; and
   generating an image data set based upon the first data, the second data, the third data, and the fourth data where
      the image data set is representative of an image comprised of
         at least first location highlighter, and
         at least one second location highlighter located within at least one first location highlighter.

16. The method of claim 15, wherein
the aircraft position is comprised of the altitude, or
the search data is further representative of the altitude.

17. The method of claim 15, wherein
the reference location is comprised of
   a search pattern datum, or
   a commencement search point.

18. The method of claim 15, wherein each first location highlighter corresponds to one threat level.

19. The method of claim 15, wherein each second location highlighter corresponds to one threat level.

20. The method of claim 15, further comprising:
   providing the image data set to at least one display unit, whereby
      the image represented in the image data set is presented on each display unit.

\* \* \* \* \*